United States Patent
Kajikawa

(10) Patent No.: US 10,941,816 B2
(45) Date of Patent: Mar. 9, 2021

(54) DRIVING FORCE CONNECTING/DISCONNECTING DEVICE

(71) Applicant: AISIN SEIKI KABUSHIKI KAISHA, Kariya (JP)

(72) Inventor: Atsushi Kajikawa, Hekinan (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 275 days.

(21) Appl. No.: 16/086,096

(22) PCT Filed: Jan. 26, 2017

(86) PCT No.: PCT/JP2017/002833
§ 371 (c)(1),
(2) Date: Sep. 18, 2018

(87) PCT Pub. No.: WO2017/169051
PCT Pub. Date: Oct. 5, 2017

(65) Prior Publication Data
US 2020/0292009 A1    Sep. 17, 2020

(30) Foreign Application Priority Data

Mar. 28, 2016 (JP) .............................. JP2016-064721

(51) Int. Cl.
*F16D 1/02* (2006.01)
*F16D 11/10* (2006.01)
(Continued)

(52) U.S. Cl.
CPC ................ *F16D 11/10* (2013.01); *F16D 1/02* (2013.01); *F16D 3/06* (2013.01); *B60K 17/02* (2013.01);
(Continued)

(58) Field of Classification Search
CPC ... F16D 11/10; F16D 1/02; F16D 3/06; F16D 27/118; B60K 23/08; B60K 17/02; B60K 17/34
See application file for complete search history.

(56) References Cited

U.S. PATENT DOCUMENTS 4,545,456 A * 10/1985 Lake ....................... F16D 43/02
180/233
4,561,520 A * 12/1985 Fogelberg ............... F16D 27/10
180/247

(Continued)

FOREIGN PATENT DOCUMENTS

DE    10 2013 205 174 A1    9/2014
FR         2 679 303 A1    1/1993
(Continued)

OTHER PUBLICATIONS

International Search Report (PCT/ISA/210) dated Apr. 25, 2017, by the Japanese Patent Office as the International Searching Authority for International Application No. PCT/JP2017/002833.
(Continued)

*Primary Examiner* — David J Hlavka
(74) *Attorney, Agent, or Firm* — Buchanan Ingersoll & Rooney PC

(57) ABSTRACT

A driving force connecting/disconnecting device includes an externally toothed spline provided on an outer periphery of one of a first shaft member and a second shaft member, an internally toothed spline engageable with the externally toothed spline, a sleeve provided with the internally toothed spline which is engageable with the externally toothed spline by moving in an axis line direction and connecting the first shaft member and the second shaft member for transmitting the driving force, a moving mechanism which moves the sleeve in the axis line direction, a holder which holds the sleeve and the moving mechanism, and a positioning mecha-
(Continued)

nism for positioning the holder in the axis line direction by bringing the holder into contact with the one of the first shaft member and the second shaft member thereby to mount the holder to the first shaft member.

5 Claims, 15 Drawing Sheets

(51) Int. Cl.
*F16D 3/06* (2006.01)
*B60K 17/02* (2006.01)
*B60K 17/34* (2006.01)
*B60K 23/08* (2006.01)
*F16D 27/118* (2006.01)

(52) U.S. Cl.
CPC .............. *B60K 17/34* (2013.01); *B60K 23/08* (2013.01); *F16D 27/118* (2013.01)

(56) References Cited

U.S. PATENT DOCUMENTS

| | | | | |
|---|---|---|---|---|
| 5,386,898 | A * | 2/1995 | Weilant | B60K 23/08 180/247 |
| 5,605,213 | A * | 2/1997 | White | B60K 23/08 180/247 |
| 5,997,428 | A | 12/1999 | Kagata et al. | |
| RE39,054 | E | 4/2006 | Kagata et al. | |
| 7,654,376 | B2 * | 2/2010 | Liu | F16D 11/10 192/69.91 |
| 9,200,684 | B2 * | 12/2015 | Fujii | F16H 48/22 |
| 9,422,988 | B2 * | 8/2016 | Beesley | F16D 27/02 |
| 10,323,699 | B2 * | 6/2019 | Beesley | F16D 13/52 |
| 2011/0108352 | A1 * | 5/2011 | Haggerty | B60K 23/04 180/348 |
| 2015/0068862 | A1 * | 3/2015 | Fujii | F16D 11/14 192/84.9 |

FOREIGN PATENT DOCUMENTS

| | | |
|---|---|---|
| JP | S59-54221 U | 4/1984 |
| JP | S62-25361 U | 2/1987 |
| JP | 2003-278800 A | 10/2003 |
| JP | 2014-199100 A | 10/2014 |

OTHER PUBLICATIONS

Written Opinion (PCT/ISA/237) dated Apr. 25, 2017, by the Japanese Patent Office as the International Searching Authority for International Application No. PCT/JP2017/002833.

* cited by examiner

DRIVING FORCE CONNECTING/DISCONNECTING DEVICE

TECHNICAL FIELD OF INVENTION

This invention relates to a driving force connecting/disconnecting device for connecting or disconnecting a power transmission from a power source of a vehicle.

BACKGROUND TECHNOLOGY OF INVENTION

Conventionally, as an example of a driving force connecting/disconnecting device which switches over a vehicle state between a four-wheel drive state and a two-wheel drive state, a driving force connecting/disconnecting device has been known which is provided with a first shaft member and a second shaft member which are coaxially provided in a driving force transmitting route through which a driving force from a power source is transmitted, allowing a relative rotation about an axis line and an externally toothed spline provided on an outer periphery of one of the first and the second shaft members and a sleeve which is provided with an internally toothed spline connected to the other of the first and the second shaft members and being movable in the axis line direction on the common shaft. The sleeve is moved in the axis line direction by an actuator to engage the internally toothed spline with the externally toothed spline to connect the first shaft member and the second shaft member. Thus, the power from the power source of the vehicle is transmitted by the driving force connecting/disconnecting device. (Patent Literature 1)

DOCUMENT LIST OF RELATED ART

Patent Literature

Patent Literature 1: DE 102013205174 A

SUMMARY OF INVENTION

Problems to be Solved by Invention

However, according to the conventional driving force connecting/disconnecting device, a solenoid, the operable distance of which is short, is used in the actuator. Therefore, the positioning of the sleeve which has internally toothed spline to be engaged with the externally toothed spline provided on one of the first and the second shaft members in an axis line direction requires a high accurate positioning. However, according to the conventional structure, the sleeve which has the internally toothed spline which engages with the externally toothed spline provided on one of the first and the second shaft members by the movement in the axis line direction is housed in the housing of the moving mechanism which moves the sleeve in the axis line direction. The housing of the moving mechanism in which the sleeve is housed is attached to the one of the first and the second shaft members via the bearing. Accordingly, the positioning of the housing, i.e., the sleeve in an axis line direction relative to the one of the first and the second shaft members has to be indirectly made via the bearing and the accuracy of positioning is not sufficient and improvement in an accurate positioning has been demanded.

The present invention was made in consideration with the above problems and the objective of the invention is to provide a driving force connecting/disconnecting device which can improve the accuracy of positioning of the sleeve in an axis line direction, performing a spline engagement to move the sleeve in the axis line direction.

Means to Solve the Problem(s)

In order to solve the problems, the connecting/disconnecting device according to the invention includes a first shaft member provided in a power transmitting route which transmits a driving force from a power source and being rotatable about an axis line, a second shaft member coaxially provided allowing a relative rotation to the first shaft member, an externally toothed spline provided on an outer periphery of one of the first shaft member and the second shaft member and having a plurality of external teeth in a peripheral direction, an internally toothed spline provided on an inner periphery to be in spline engagement with the externally toothed spline and having a plurality of internal teeth in a peripheral direction, a sleeve provided with the internally toothed spline on an inner periphery thereof to be in spline engagement with the externally toothed spline by moving in an axis line direction and connecting the first shaft member and the second shaft member for transmitting the driving force by connecting the other of the first shaft member and the second shaft member, a moving mechanism which moves the sleeve in the axis line direction, a holder which holds the sleeve and the moving mechanism thereto for holding thereof and a positioning mechanism for positioning the holder in an axis line direction relative to the one of the first shaft member and the second shaft member by bringing the holder into contact with the one of the first shaft member and the second shaft member thereby to mount the holder to the first shaft member.

Effect of Invention

According to the feature above, the holder which attaches the sleeve provided with the internally toothed spline in spline engagement with the externally toothed spline by moving in the axis line direction relative to the one of the first and the second shaft members which is provided with the externally toothed spline and the moving mechanism is brought into contact with the one of the first and the second shaft members to be positioned in the axis line direction relative to the one of the first and the second shaft members and is mounted to the one of the first and the second shaft members by the positioning mechanism. Accordingly, the holder i.e., the sleeve can be directly positioned in the axis line direction without intervening other members, such as bearing just contacting the holder to the one of the first and the second shaft members. As a result, the positioning accuracy can be improved for positioning the sleeve in the axis line direction by moving in the axial direction by the spline engagement between the externally toothed spline and the internally toothed spline.

BRIEF EXPLANATION OF ATTACHED DRAWINGS

THE EMBODIMENTS FOR IMPLEMENTING THE INVENTION

Figure 1:
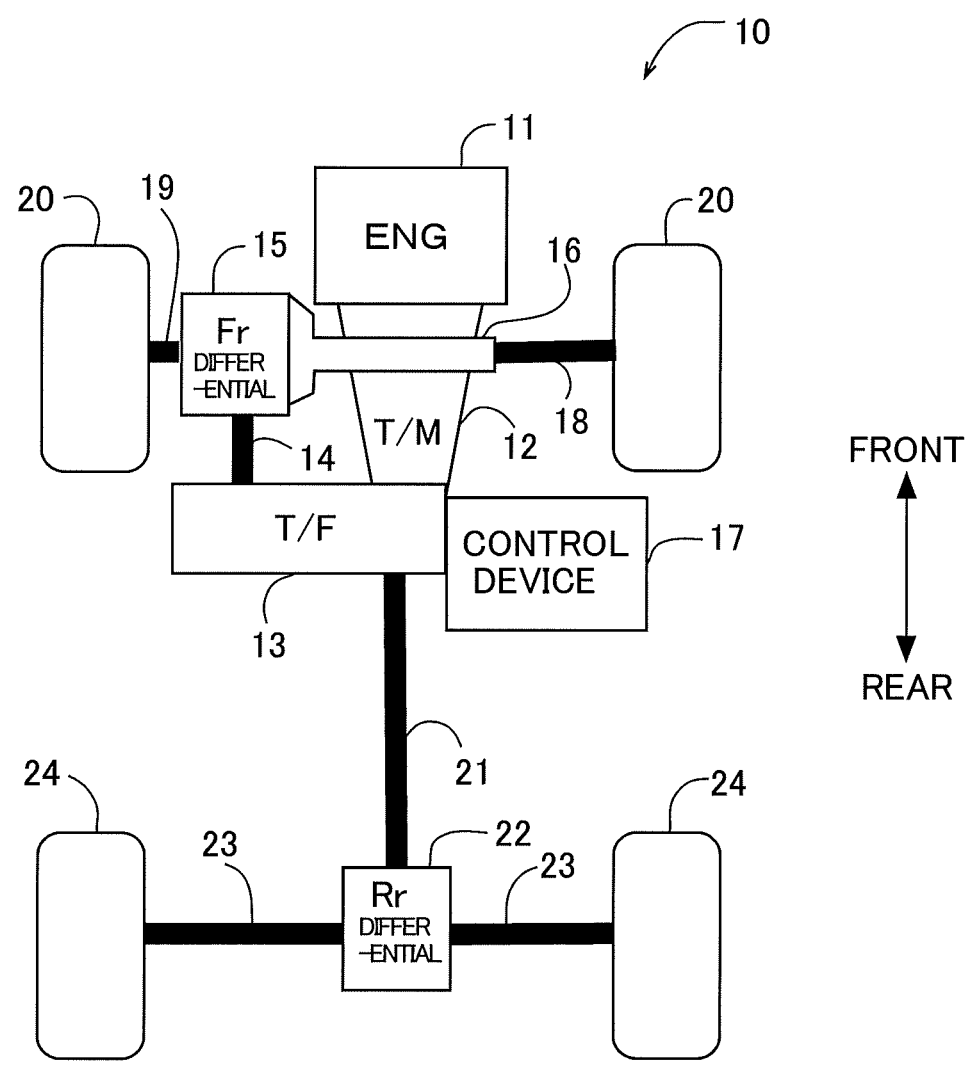
FIG. 1 is a structural view of the driving force connecting/disconnecting device of the invention applied to a vehicle.

As an embodiment of the invention, the driving force connecting/disconnecting device applied to the vehicle will be explained hereinafter with reference to FIG. 1. The vehicle 10 includes an engine which is the power source, a transmission 12, a transfer 13, a front propeller shaft 14, a front differential mechanism 15, the driving force connecting/disconnecting device 16, a control device 17, a right front drive shaft 18, a left front drive shaft 19, front wheels 20, a rear propeller shaft 21, a rear differential mechanism 22, rear drive shafts 23 and rear wheels 24.

When the driving force generated at the engine 11 is transmitted to the transfer 13 via the transmission 12, the driving force is distributed to the front propeller shaft 14 and the rear propeller shaft 21. The driving force distributed to the rear propeller shaft 21 is transmitted to the right and left wheels 24 via the rear differential mechanism 22 and the respective rear drive shafts 23.

On the other hand, the driving force distributed to the front propeller shaft 14 is transmitted to the front differential mechanism 15. According to the above structure, the driving mode of the vehicle can be selected between the four-wheel drive and the two-wheel drive by the operation of the driver or by the control device 17 depending on the running condition of the vehicle.

When the four-wheel drive mode is selected, the driving force connecting/disconnecting device 16 connects the front differential mechanism 15 and the right front drive shaft 18 based on a control signal from the control device 17. Thus, the driving force transmitted to the front differential mechanism 15 is distributed to the left front drive shaft 19 and the right front drive shaft 18 via the driving force connecting/disconnecting device 16 and finally transmitted to the right and left wheels 20 to thereby establish the four-wheel drive mode.

Further, after the four-wheel drive mode has finished by the operation of the driver or by the control device 17 according to the running condition of the vehicle and when the two-wheel drive mode is selected thereafter, the driving force connecting/disconnecting device 16 disconnects the front differential mechanism 15 and the right front drive shaft 18 based on the control signal from the control device 17. Thus, the front differential mechanism 15 merely idly rotates and does not transmit the driving force, to thereby establish the two-wheel drive mode.

Next, one embodiment of the driving force connecting/disconnecting device according to the invention will be explained hereinafter with reference to FIGS. 2 through 15.

<Overall Structure of Connecting/Disconnecting Device>

Figure 2:
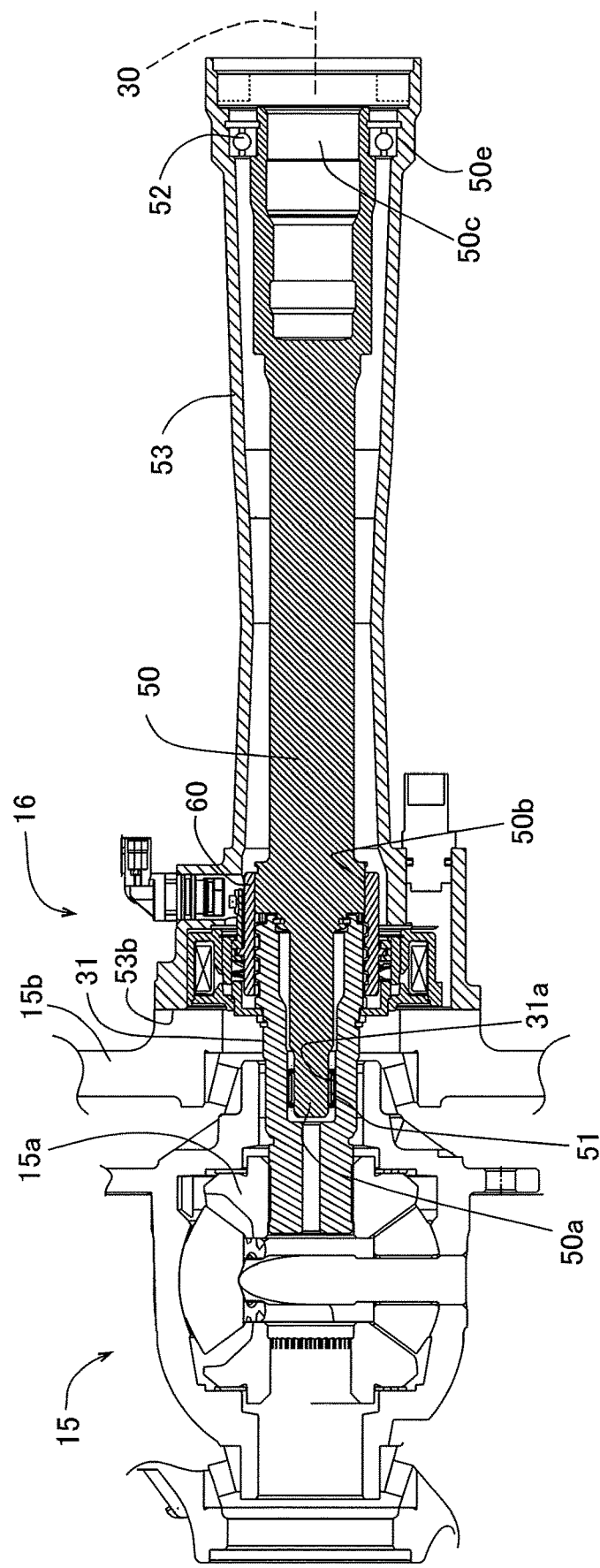
FIG. 2 is a cross-sectional view of the driving force connecting/disconnecting device shown in FIG. 1.

As shown in FIG. 2, the driving force connecting/disconnecting device 16 includes the first shaft member 31 disposed between the front differential mechanism 15 and the right front drive shaft 18 and being rotatable about the axis line 30 and the second shaft member 50 which is provided coaxially with the first shaft member 31 and being relatively rotatable thereto. As shown in FIG. 2, the first shaft member 31 is provided with a small diameter bearing portion 31a at the inside of the hollow cylindrical portion.

Figure 3:
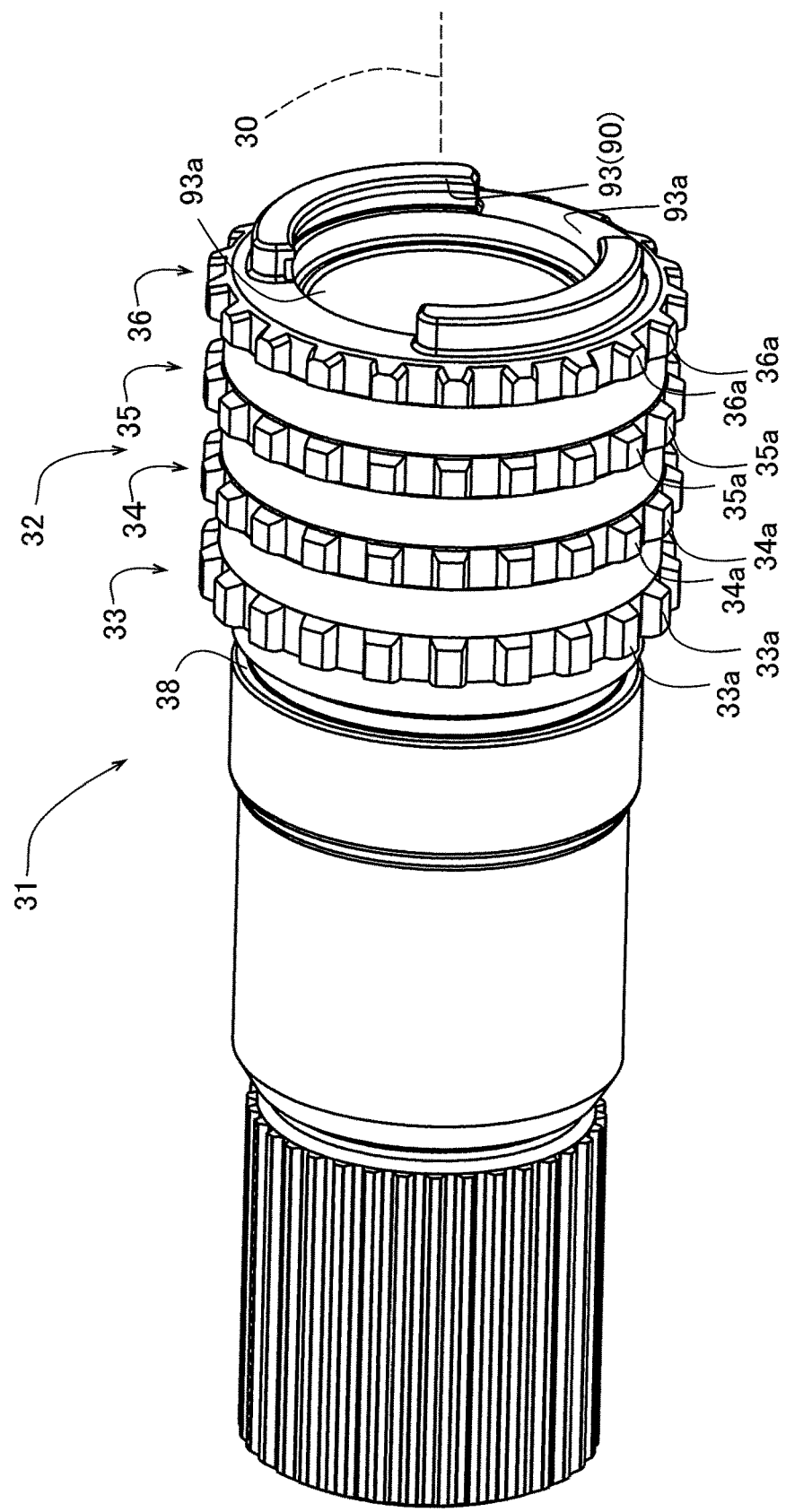
FIG. 3 is a perspective view of the overall structure of the first shaft member shown in FIG. 2.

The first shaft member 31 is, as shown in FIG. 2, connected at one end thereof to one of the side gears 15a of the front differential mechanism 15 which distributes the driving force to the front wheels 20. As shown in FIG. 3, the outer periphery of the first shaft member 31 is provided with the externally toothed spline 32 which includes a plurality of external teeth in a peripheral direction. One externally toothed spline 32 is provided on the outer periphery of the first shaft member 31 or as shown in FIG. 3, a plurality of externally toothed splines 32 is provided on the outer peripheral surface of the first shaft member 31 with a distance apart from one another in the axis line 30 direction.

The externally toothed spline 32 includes, as shown in FIG. 3, the first externally toothed spline 33, the second externally toothed spline 34, the third externally toothed spline 35 and the fourth externally toothed spline 36 in order from left to right in the drawing. The first externally toothed spline 33 is provided with a plurality of external teeth 33a in a peripheral direction. Similarly, the second externally toothed spline 34 is provided with a plurality of external teeth 34a in a peripheral direction. Similarly, the third externally toothed spline 35 is provided with a plurality of external teeth 35a in a peripheral direction. Further, still similarly, the fourth externally toothed spline 36 is provided with a plurality of external teeth 36a in a peripheral direction.

Figure 4:
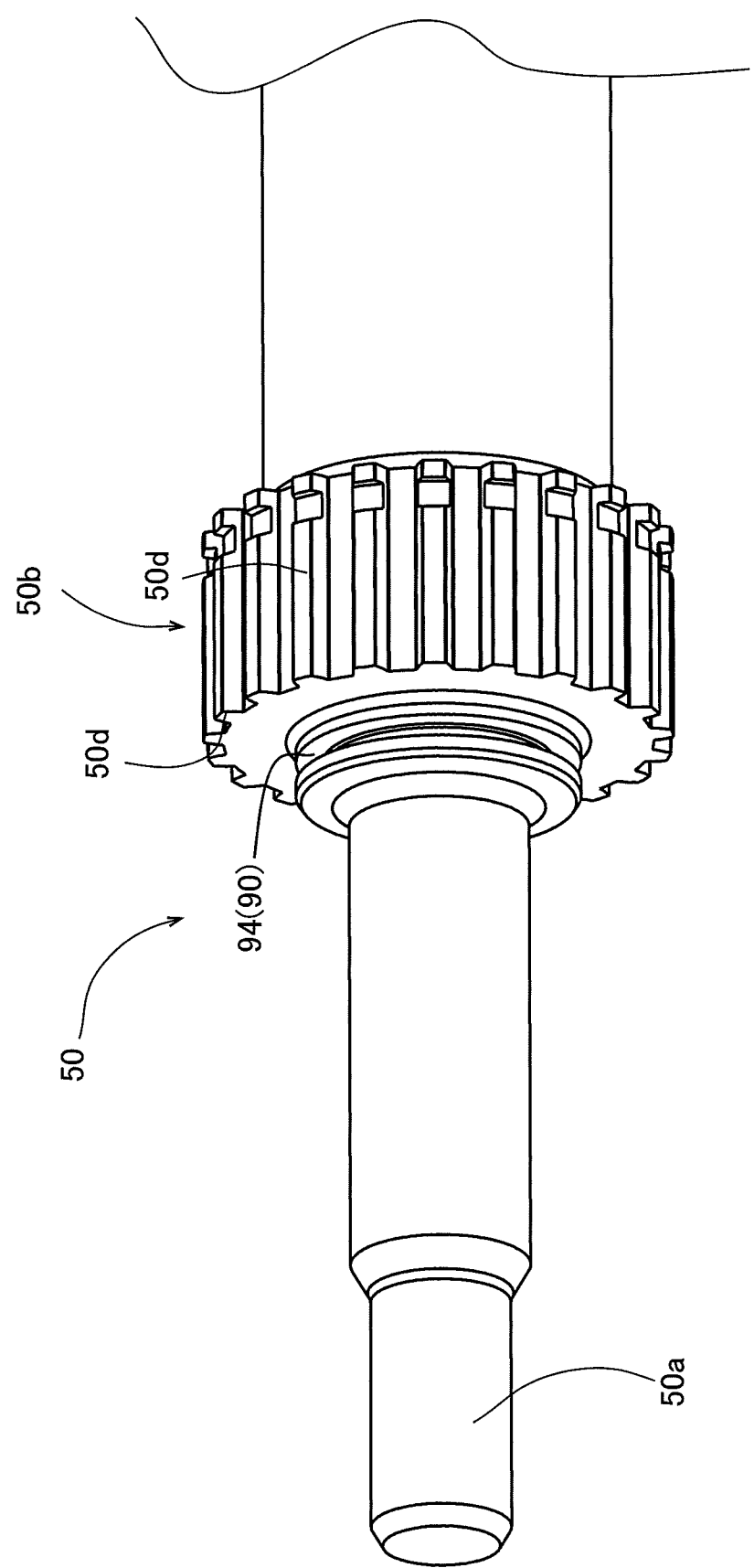
FIG. 4 is a perspective view of the second shaft member shown in FIG. 2, but a pat thereof being omitted from the view.

The second shaft member 50 is in a cylindrical columnar shape as shown in FIGS. 2 and 4 and includes a reduced diameter tip end portion 50a, a large diameter portion 50b and a drive shaft connecting portion 50c which is connected to the right front drive shaft 18. A plurality of locking teeth 50d is provided on an outer periphery of the large diameter portion 50b of the second shaft member 50. This plurality of locking teeth 50d is always engaging with the sleeve 60 which will be explained later to make the second shaft member 50 rotate together with the sleeve 60 about the axis line 30 as a unit.

The second shaft member 50 is locked by the detent mechanism 90, which will be explained later, to allow a relative rotation relative to the first shaft member 31, but the relative movement in the axis line 30 direction relative to the first shaft member 31 is prohibited. The drive shaft connecting portion 50c of the second shaft member 50 is provided with a bearing portion 50e on the outer peripheral surface thereof. The second shaft member 50 is supported by the bearing 51 at the bearing portion 50e on the shaft cover 53.

Figure 5:
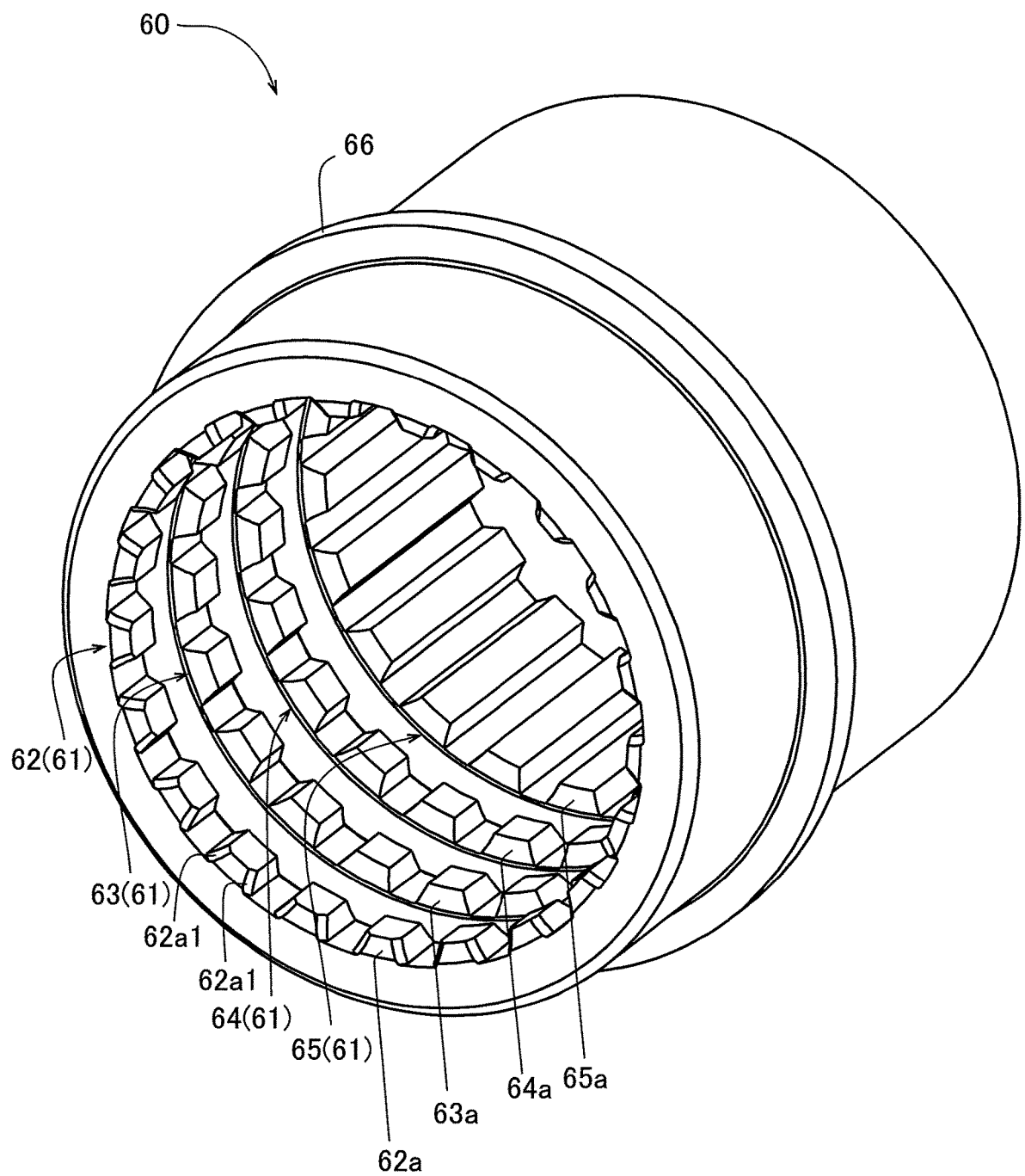
FIG. 5 is a perspective view of the overall structure of the sleeve shown in FIG. 2.

As shown in FIG. 5, the sleeve 60 is in an annular shape and is provided with an internally toothed spline 61 with a plurality of internal teeth arranged in a peripheral direction. One internally toothed spline 61 is provided on the inner periphery of the sleeve 60 or as shown in FIG. 5, a plurality of internally toothed splines 61 is provided on the inner peripheral surface of the sleeve 60 with a distance apart from one another in the axis line 30 direction. The internally toothed spline 61 includes, as shown in FIG. 5, the first internally toothed spline 62, the second internally toothed spline 63, the third internally toothed spline 64 and the fourth internally toothed spline 65 in order from left to right in the drawing. The flange portion 66 is provided on the outer peripheral surface of the sleeve 60 extending outwardly in a radial direction.

The first internally toothed spline 62 is provided with a plurality of internal teeth 62a in a peripheral direction. Similarly, the second internally toothed spline 63 is provided with a plurality of internal teeth 63a in a peripheral direction. Similarly, the third internally toothed spline 64 is provided with a plurality of internal teeth 64a in a peripheral direction. Further similarly, the fourth internally toothed spline 65 is provided with a plurality of internal teeth 65a in a peripheral direction. It is noted that the length in the axis line direction of the plurality of internal teeth 65a of the fourth internally toothed spline 65 is set to be longer than the other internal teeth 62a through 64a in the axis line 30 direction of the first through third internally toothed splines 62 through 64.

The internally toothed spline 61 provided on the sleeve 60 moves in the axis line 30 direction by the moving mechanism 70 to have the first through fourth internally toothed splines 62 through 65 of the internally toothed spline 61 engage with the first through fourth externally toothed splines 33 through 36. Such engagement of the splines is made by the engagement between the plurality of internal teeth 62a through 65a of the first through fourth internally toothed splines 62 through 65 and the plurality of external teeth 33a through 36a of the first through fourth externally toothed splines 33 through 36, respectively. It is noted here that the plurality of internal teeth 65a of the fourth internally toothed spline 65 on the sleeve 60 is always engaging with the plurality of locking teeth 60d provided on the second shaft member 50 to always connect the sleeve 60 and the second shaft member 50.

The holder 79 (which will be explained later) is provided which assembles the sleeve 60 and the moving mechanism 70 to the inner portion to be capable of holding the sleeve 60 and the moving mechanism 70 therein. The positioning of the holder 79, i.e., the sleeve 60 relative to the axis line 30 direction is performed by the positioning mechanism 80 (later explained).

The shaft cover 53 is formed in a hollow shape as shown in FIG. 2 and one end of the cover has a bowl-shaped opening. The shaft cover 53 includes a differential carrier connecting portion 53b which is connected to a carrier case 15b. The carrier case 15b pivotally supports and houses the front differential mechanism 15. The shaft cover 53 covers a portion from the drive shaft connecting portion 50c of the second shaft member 50 to the externally toothed spline 32 of the first shaft member 31 along in the axis line 30 direction.

<Moving Mechanism>

The moving mechanism 70 which moves the sleeve 60 in an axis line 30 direction will be explained hereinafter. The moving mechanism 70 is formed by, for example, an electromagnetic actuator which drives the sleeve 60 electromagnetically. The moving mechanism 70, as shown in FIG. 6, includes an electromagnetic coil 71 inside thereof, a core 72 which generates a magnetic suction force by the excitation of the electromagnetic coil 71 and a movable armature 73 connected to the sleeve 60 and movable in an axis line 30 direction by the magnetic suction force of the core 72.

Figure 6:
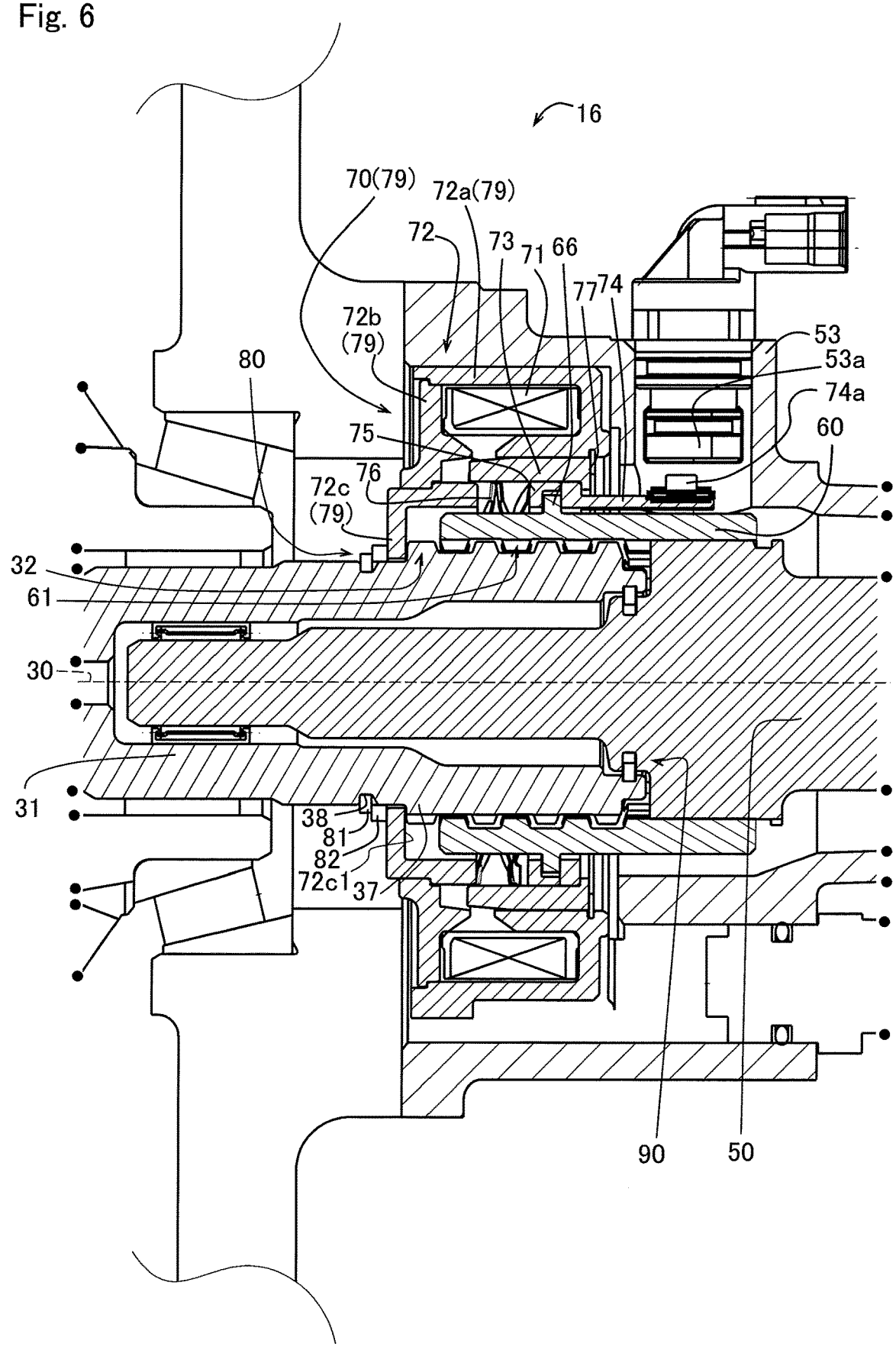
FIG. 6 is an explanatory view explaining the driving force connecting/disconnecting device being in a non-connected state.

The core 72 includes, as shown in FIG. 6, a first core portion 72a and a second core portion 72b and a third core portion 72c which surround the electromagnetic coil 71 and the first through third core portions 72a through 72c are formed by, for example, a magnetic material such as iron. The connection of the movable armature 73 and the sleeve 60 is made as shown in FIG. 6, by holding the flange portion 66 of the sleeve 60 between the arm portion 74 which is engaged with the movable armature 73 and the plate portion 75 which is spring-biased in one direction (the right direction as viewed in FIG. 6) of the axis line 30 direction and the sleeve 60, thus being movable with the movable armature 73 in the axis line 30 direction as a unit.

The plate portion 75, the flange portion 66 of the sleeve 60, the arm portion 74 and the movable armature 73 are biased to be displaced in the one (right direction as viewed in FIG. 6) of the axis line 30 direction by the force of the spring 76 provided between the third core portion 72c and the plate portion 75. Such movement in the right direction of the plate portion 75, the flange portion 66 of the sleeve 60, the arm portion 74 and the movable armature 73 by the spring 76 is restricted by the contact of the movable armature 73 with the stopper ring 77 provided at the first core portion 72a. The magnet 74a is provided at the tip end of the arm portion 74 for detecting the position of the sleeve 60 in the axis line 30 direction. The detecting signal of the position of the magnet 74a is detected by the stroke sensor 53a provided at the shaft cover 53 and the detected signal is sent to the control device 17.

When the electromagnetic coil 71 is not excited, the movable armature 73 connected to the sleeve 60 is displaced in the one (right direction as viewed in FIG. 6) of the axis line 30 direction by the biasing force of the spring 76 as shown in FIG. 6 and is brought into contact with the stopper ring 77. Then, the internally toothed spline 61 of the sleeve 60 which is connected to the second shaft member 50 is not in spline engagement with the externally toothed spline 32 of the first shaft member 31. Thus, the first shaft member 31 and the second shaft member 50 are not connected and the driving force from the engine 11 cannot be transmitted.

Figure 7:
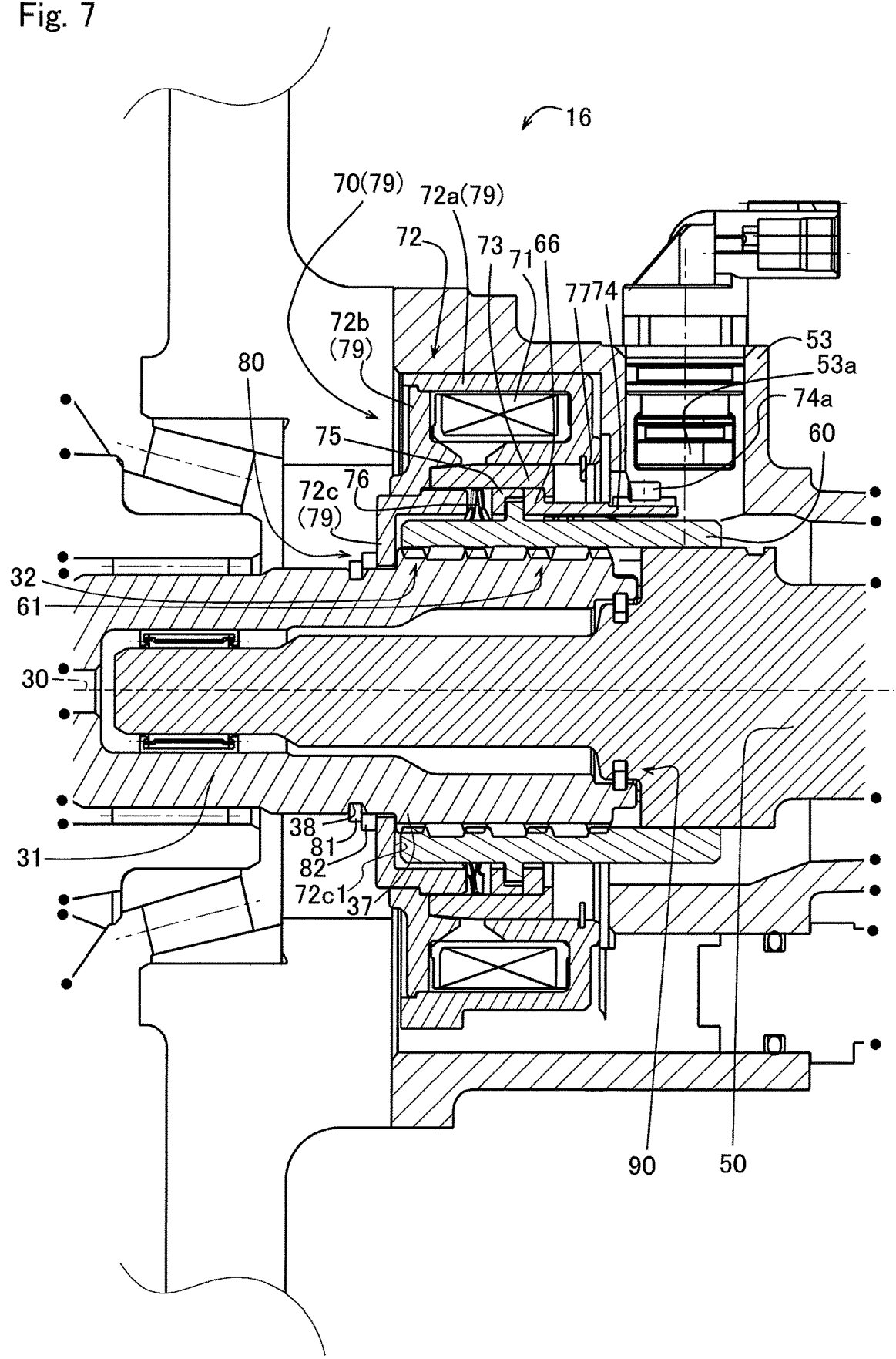
FIG. 7 is an explanatory view explaining the driving force connecting/disconnecting device being in a connected state.

By the receipt of the control signal from the control device 17, the electromagnetic coil 71 is excited and the magnetic suction force is generated. Then, the movable armature 73 connected to the sleeve 60 is displaced in the other (left direction as viewed in FIG. 7) direction of the axis line 30 direction by the generated magnetic suction force, overcoming the biasing force of the spring 76 as shown in FIG. 7. Thus, the sleeve 60 connected to the movable armature 73 is in spline engagement with the externally toothed spline 32 of the first shaft member 31 at the internally toothed spline 61. Thus, the first shaft member 31 and the second shaft member 50 are connected through the sleeve 60 to be able to transmit the driving force from the engine 11.

By the engagement of the arm portion 74 with the shaft cover 53 at the inner diameter portion, the rotation of the moving mechanism 70 about the axis line 30 is restricted. As will be explained later, the core 72 of the moving mechanism 70 serves as the holder 79 by assembling the electromagnetic coil 71, the movable armature 73, the arm portion 74, the plate portion 75 and the spring 76 and the sleeve 60 into the inside of the core to be able to hold them inside thereof. The moving mechanism 70 and the sleeve 60 are formed as a unit.

<Positioning Mechanism>

The positioning mechanism 80 will be explained hereinafter with reference to FIG. 6. The positioning mechanism 80 positions the holder 79 in which the moving mechanism 70 and the sleeve 60 are accommodated relative to the first shaft member 31 on which the externally toothed spline 32 which engages with the internally toothed spline 61 of the sleeve 60 in the axis line 30 direction is provided and attaches the holder 79 to the first shaft member 31 for positioning. The positioning mechanism 80 makes the holder 79 in which the moving mechanism 70 and the sleeve 60 are held to be in contact with a stepped portion 37 provided at a predetermined position of the first shaft member 31 on which the externally toothed spline 32 which engages with the internally toothed spline 61 of the sleeve 60 in the axis line 30 direction is provided, at the end surface 72c1 of the third core portion 72c. Thus, the positioning of the holder 79, i.e., the sleeve 60 relative to the first shaft member 31 in the axis line 30 direction can be achieved directly without interposing any components therebetween.

As explained above, the holder 79, i.e., the sleeve 60 is positioned relative to the first shaft member 31 in the axis line 30 direction and then, the snap ring 81 (corresponding to the first snap ring) is installed in the installation groove 38 provided on the outer periphery of the first shaft member 31 via a thrust washer 82. Thus, the holder 79, i.e., the sleeve 60 is positioned on the first shaft member 31 in the axis line 30 direction relative to the first shaft member 31 and is installed thereon.

<Detent Mechanism>

Figure 8:
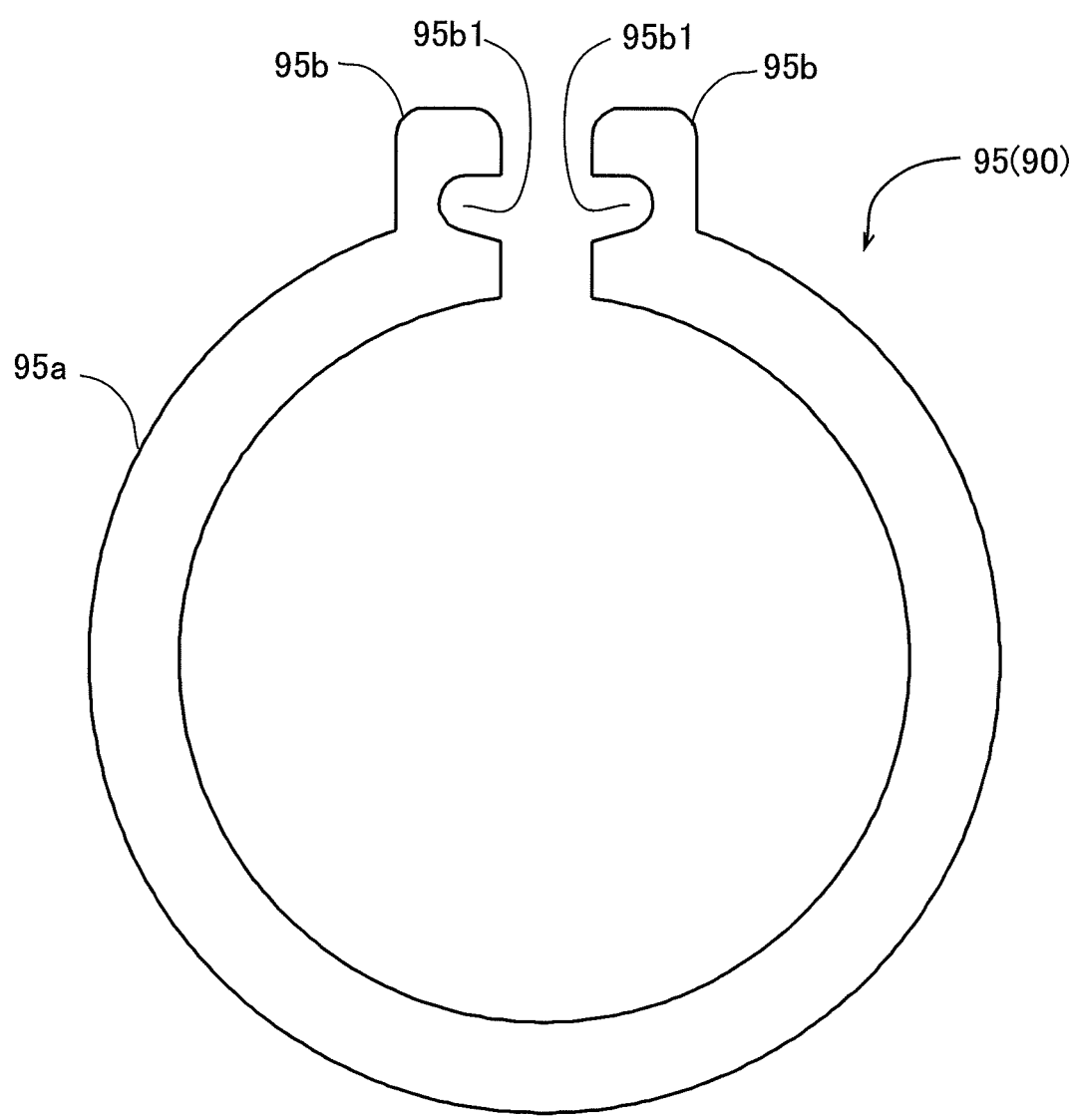
FIG. 8 is a front view of snap ring in the detent mechanism.

The detent mechanism 90 which locks the first shaft member 31 and the second shaft member 50 to allow a relative rotation but restricts the relative movement in the axis line 30 direction will be explained hereinafter. As shown in FIGS. 3, 4 and 8, the detent mechanism 90 includes the inner peripheral groove 93 (corresponding to the first detent portion) provided on the first shaft member 31 at a facing side facing the second shaft member 50, the outer peripheral groove 94 (corresponding to the second detent portion) provided on the second shaft member 50 at a facing side facing the first shaft member 31 and a snap ring 95 (corresponding to the second snap ring) as a locking member which are engaged in the inner peripheral groove 93 and the outer peripheral groove 94.

The snap ring 95 is fitted into the outer peripheral groove 94 provided on the second shaft member 50. An elastically deformable head portion 95b which projects radially outward from the outer peripheral groove 94 under a compressed state is provided at the snap ring 95, under a state that the snap ring 95 has been fitted into the outer peripheral groove 94 (the state shown in FIG. 9). The head portion 95b is formed in a fork shape according to an example shown in FIG. 8. The groove portion 95b1 is provided at the head portion 95b for easy setting of a tool (not shown) upon fitting of the snap ring 95 into the outer peripheral groove 94 by expanding thereof by using the tool.

The inner peripheral groove 93 provided on the first shaft member 31 is formed such that the depth of the groove is deeper than the outer diameter of the head portion 95b of the snap ring 95 and the head portion 95b of the snap ring 95 is wrapped by the groove to allow a relative rotation therebetween. A portion of the entire periphery of the inner peripheral groove 93 is provided with a pair of passing ports 93a which enables the head portion 95b to pass through the passing ports 93a into the inside thereof, under a state that the head portion 95b of the snap ring 95 is compressed. The passing port 93a is provided at the two mutually symmetrical points on the inner peripheral groove 93, as an example, shown in FIG. 3.

Figure 9:
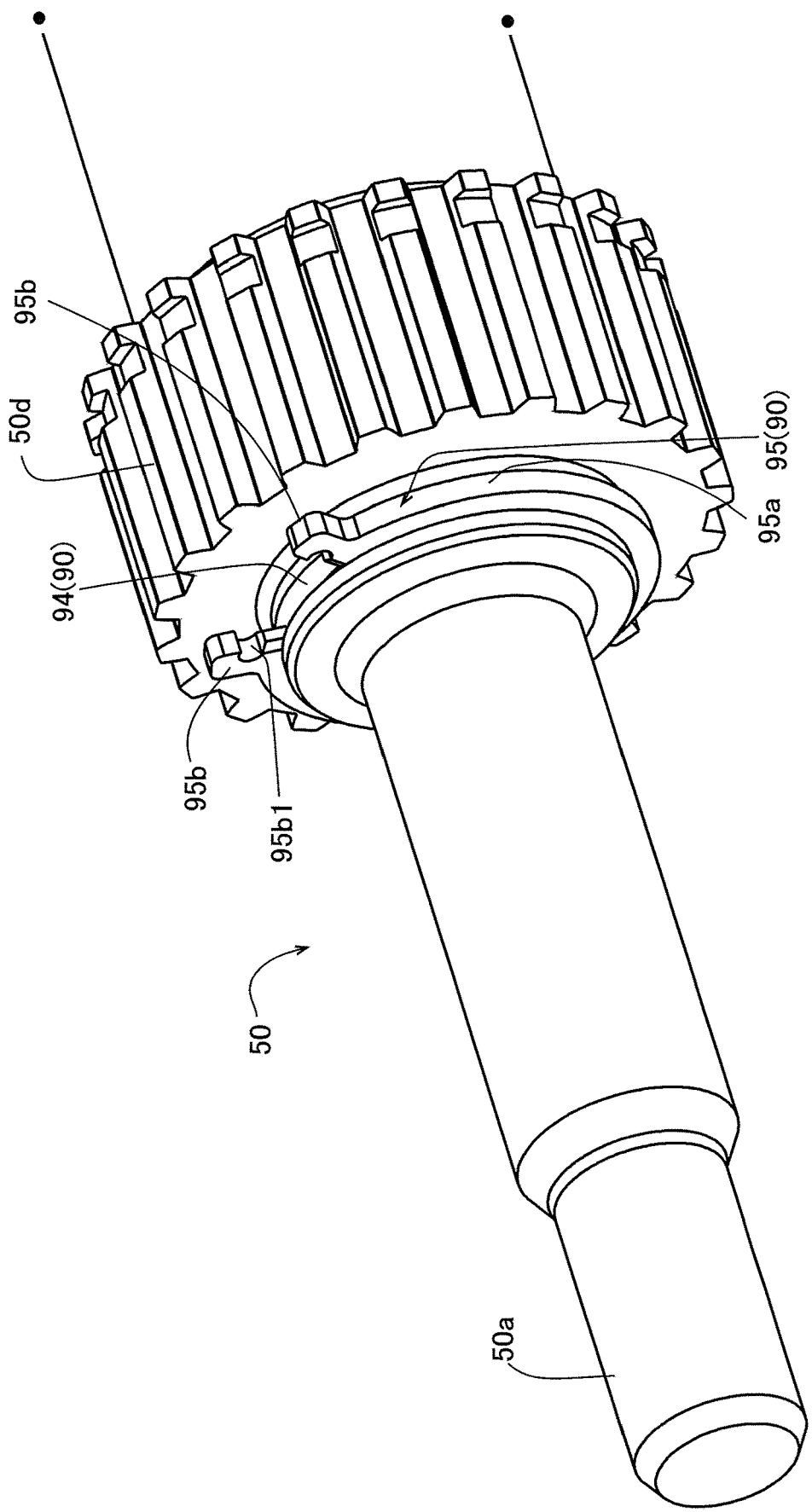
FIG. 9 is a perspective view of the snap ring of the detent mechanism in a state that the snap ring has been inserted into the outer peripheral groove.
Figure 10:
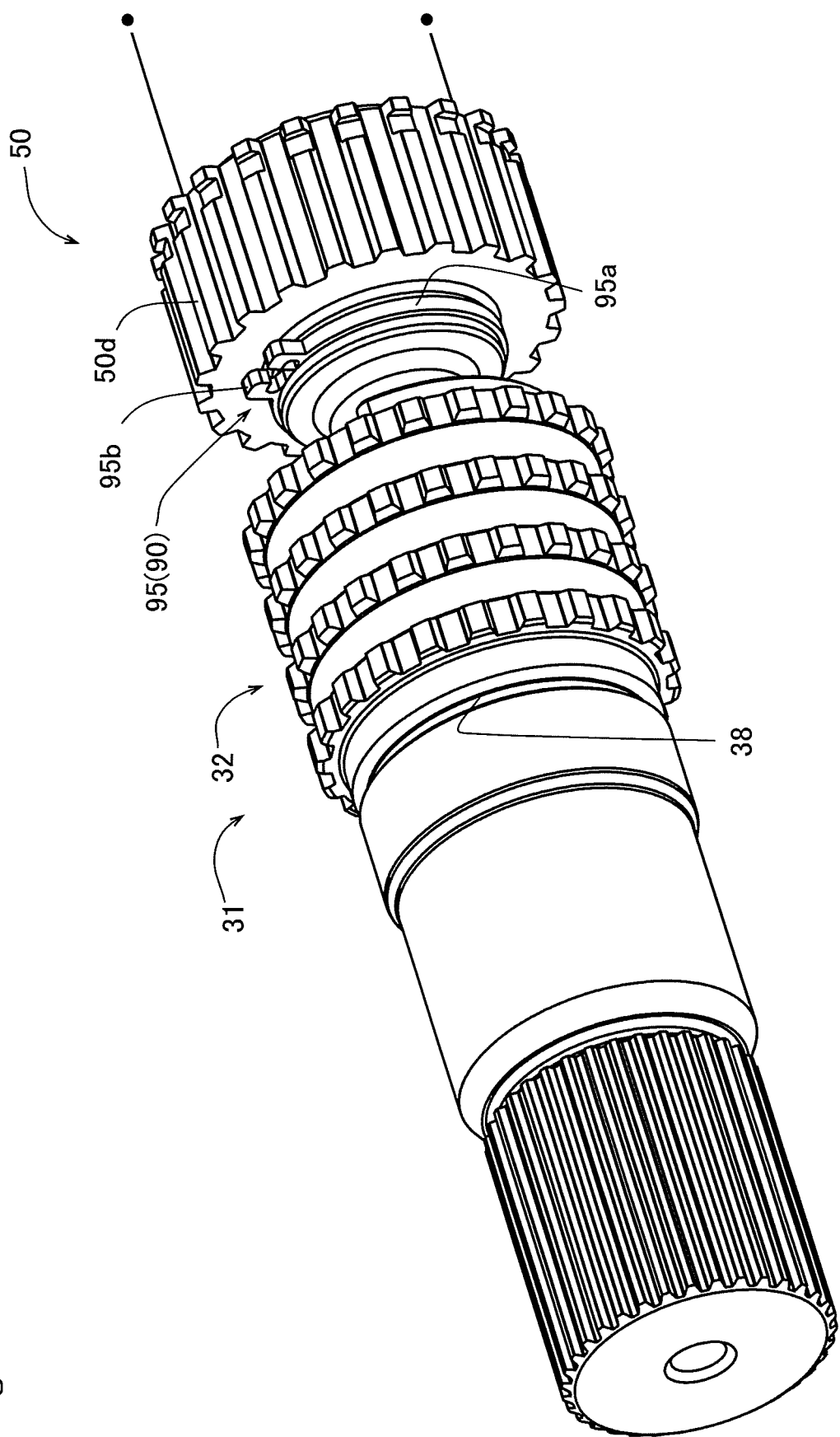
FIG. 10 is a perspective view showing the state that first shaft member is approximated to the snap ring that has been fitted into the outer peripheral groove.
Figure 11:
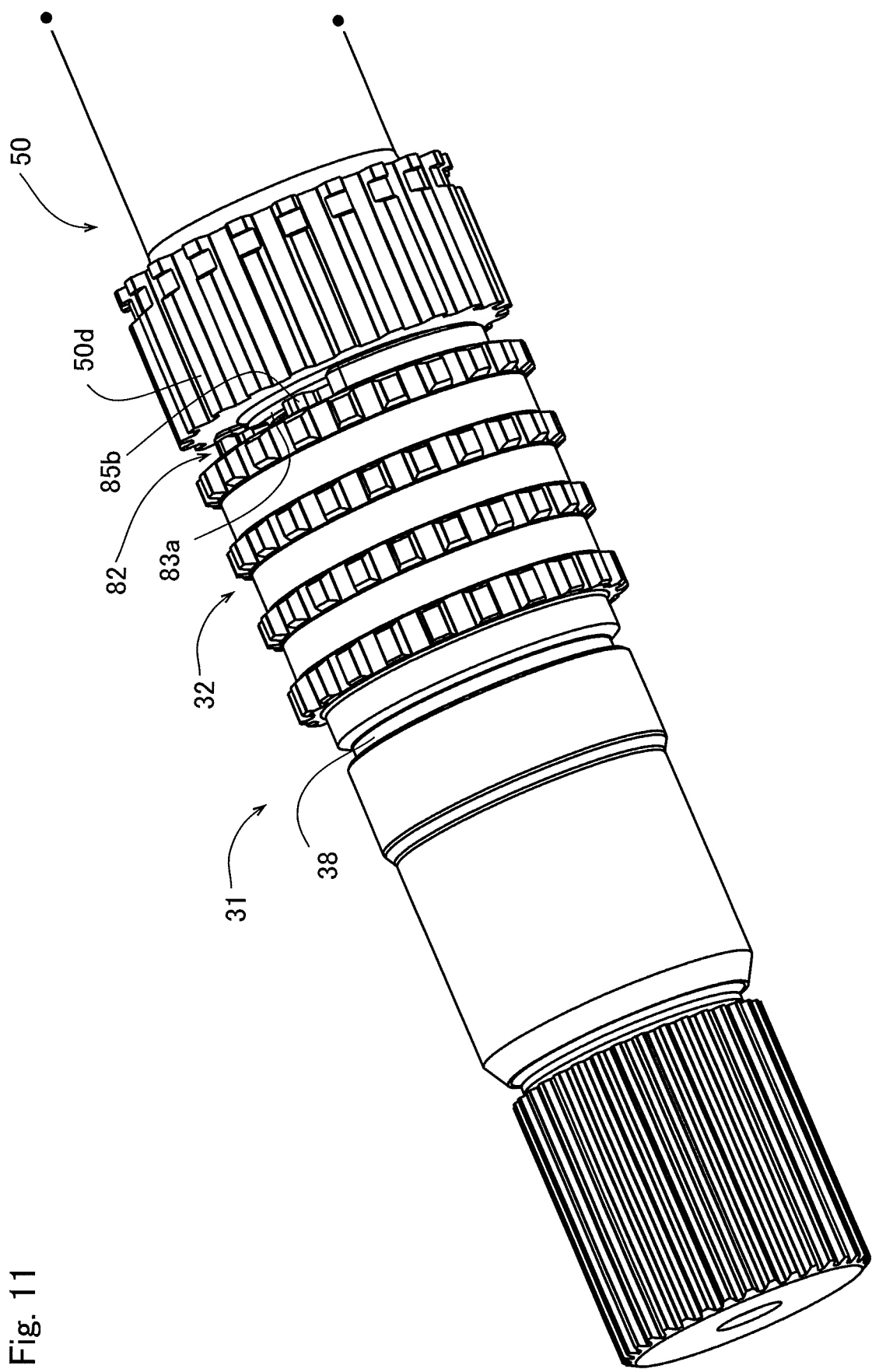
FIG. 11 is a perspective view showing the state that the first shaft member and the second shaft member are locked by the detent mechanism.
Figure 12:
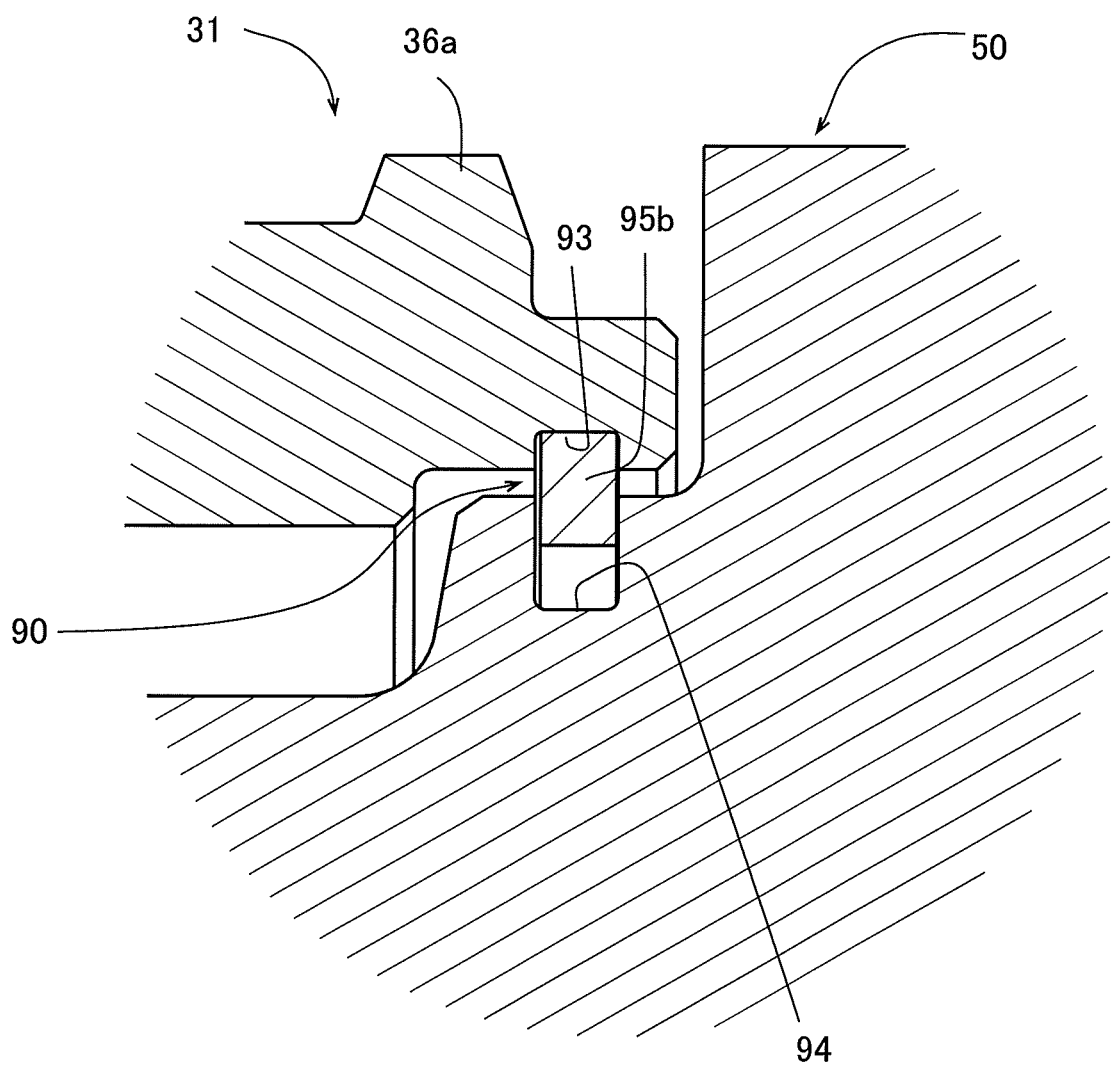
FIG. 12 is a cross-sectional view of the main portion in a state that the first shaft member and the second shaft member are locked by the detent mechanism.

Next, the locking of the first shaft member 31 and the second shaft member 50 by the detent mechanism 90 will be explained hereinafter. First, the snap ring 95 is expanded as shown in FIG. 9, and is put in the outer peripheral groove 94 of the second shaft member 50. Then, as shown in FIG. 10, the snap ring 95 is fitted into the outer peripheral groove 94 to have the snap ring 95 to be installed therein. Next, the first shaft member 31 is approached as shown in FIG. 10 and then the head portion 95b of the snap ring 95 is compressed, i.e., the width of the fork shape head portion 95b is narrowed narrower than the width of the passing port 93a. Then, the head portion 95b of the snap ring 95 passes through the passing port 93a from radially outward of the inner peripheral groove 93 to have the head portion 95b of the snap ring 95 enter the inner peripheral groove 93. The snap ring 95 which has been fitted in the inner peripheral groove 93 returns to the shape that the width of the fork shape head portion 95b is expanded wider than the width of the passing port 93a to prevent the snap ring 95 from coming off from the inner peripheral groove 93.

The inner peripheral groove 93 is deeper than the outer diameter of the head portion 95b of the snap ring 95 and wraps the head portion 95b of the snap ring 95 to allow the relative rotation therebetween. As explained, the first shaft member 31 and the second shaft member 50 are engaged to allow a relative rotation therebetween and at the same time to restrict a relative movement therebetween in an axis line 30 direction by the detent mechanism 90. Further, the first shaft member 31 and the second shaft member 50 can be handled as a single member (as a unit) by the detent mechanism 90.

<Assembling of Driving Force Connecting/Disconnecting Device>

The assembling of the driving force connecting/disconnecting device 16 will be explained hereinafter. First, the first shaft member 31 shown in FIG. 3 and the second shaft member 50 shown in FIG. 4 are engaged to allow a relative rotation therebetween and to restrict a relative movement in an axis line 30 direction by the detent mechanism 90. Then the bearing 52 is inserted into the bearing portion 50e of the second shaft member 50 and the second shaft member 50 which engages with the first shaft member 31 is disposed in the shaft cover 53.

Next, separating from the above assembling, the holder 79, i.e., the moving mechanism 70 and the sleeve 60 which have been prepared in advance are installed into the inside of the holder 79 to be held by the holder 79 and are positioned in the axis line 30 direction relative to the first shaft member 31 by the positioning mechanism 80 and after fixing the position thereof, they are installed on the first shaft member 31.

It is noted here that as will be explained hereinafter, the moving mechanism 70 and the sleeve 60 are assembled into the holder 79 to be held by the holder 79. The electromagnetic coil 71 is inserted into the first core portion 72a of the core 72 from the left side in FIG. 6 and the movable armature 73 is inserted into the inner periphery side of the first core portion 72a towards the stopper ring 77. Then, the arm portion 74 is inserted into the inner periphery side of the movable armature 73 from the left side in FIG. 6 to have the movable armature 73 engage with the arm portion 74 and the sleeve 60 is inserted into the inner periphery side of the arm portion 74 and the movable armature 73.

Next, the plate portion 75 and the spring 76 are in turn inserted into the inner periphery side of the movable armature 73 and the outer periphery side of the sleeve 60 from the left side in FIG. 6 and the flange portion 66 of the sleeve 60 is arranged such that the flange portion 66 is sandwiched between the arm portion 74 which is engaged with the movable armature 73 and the plate portion 75 which is biased by spring in the axis line 30 direction. Thus, the sleeve 60 is movable in the axis line 30 direction together with the movable armature 73 as a unit.

Next, the second core portion 72b and the third core portion 72c integrated as a unit are fixed to the first core portion 72a as shown in FIG. 6. Thus, the core 72 of the moving mechanism 70 houses the electromagnetic coil 71 of the moving mechanism 70, the movable armature 73, the arm portion 74, the plate portion 75 and the spring 76 and the sleeve 60 inside and serves as the holdable holder 79.

<Operation of Driving Force Connecting/Disconnecting Device>

The operation of thus structured driving force connecting/disconnecting device 16 will be explained hereinafter. The sleeve 60 and the second shaft 50 are normally connected by the normal engagement between the plurality of internal teeth 65a of the fourth internally toothed spline 65 of the sleeve 60 and the plurality of locking teeth 50d provided on the second shaft member 50, as stated above. For example, the case where the driving mode is switched over to the four-wheel drive mode by the driver of the vehicle, or the case where the driving mode is selected to the two-wheel drive mode based on the vehicle running state by the control device 17 will be explained. Since the electromagnetic coil 71 is not excited by the control device 17, the movable armature 73 connected to the sleeve 60 is displaced in the one (right side direction in FIG. 6) direction of the axis line 30 direction by the biasing force of the spring 76 and is brought into contact with the stopper ring 77.

Thus, the internally toothed spline 61 of the sleeve 60 connected to the second shaft member 50 is not in spline-engagement with the externally toothed spline 32 of the first shaft member 31. In concrete, the plurality of internal teeth 62a through 65a of each of the first through fourth internally toothed splines 62 through 65 of the internally toothed spline 61 of the sleeve 60 is not in spline engagement with the plurality of external teeth 33a through 36a of each of the first through fourth externally toothed splines 33 through 36 of the externally toothed spline 32 of the first shaft member 31. Thus, the first shaft member 31 and the second shaft member 50 are disconnected from each other not to transmit the driving force from the engine 11.

On the other hand, operation of driving force connecting/disconnecting device in the case where the driving mode is switched over to the four-wheel drive mode by the driver of the vehicle, or in the case where the driving mode is selected to the four-wheel drive mode based on the vehicle running state by the control device 17 will be explained. When the electromagnetic coil 71 is excited based on the control signal from the control device 17 to generate a magnetic suction force at the core 72, the movable armature 73 connected to the sleeve 60 is displaced by the magnetic suction force overcoming the biasing force of the spring 76 in the other (left side direction in FIG. 7) direction of the axis line 30 direction as shown in FIG. 7. The movable armature 73 is brought into contact with the end surface of the second core portion 72b to restrict the left side movement in the axis line 30 direction, as shown in FIG. 7.

Thus, the internally toothed spline 61 of the sleeve 60 connected to the second shaft member 50 is in spline-engagement with the externally toothed spline 32 of the first shaft member 31. In concrete, the plurality of internal teeth 62a through 65a of each of the first through fourth internally toothed splines 62 through 65 of the internally toothed spline 61 of the sleeve 60 is in spline engagement with the plurality of external teeth 33a through 36a of each of the first through fourth externally toothed splines 33 through 36 of the externally toothed spline 32 of the first shaft member 31. Thus, the first shaft member 31 and the second shaft member 50 are connected through the sleeve 60 to transmit the driving force from the engine 11.

<Plunging Externally Toothed Spline and Plunging Internally Toothed Spline>

Figure 13:
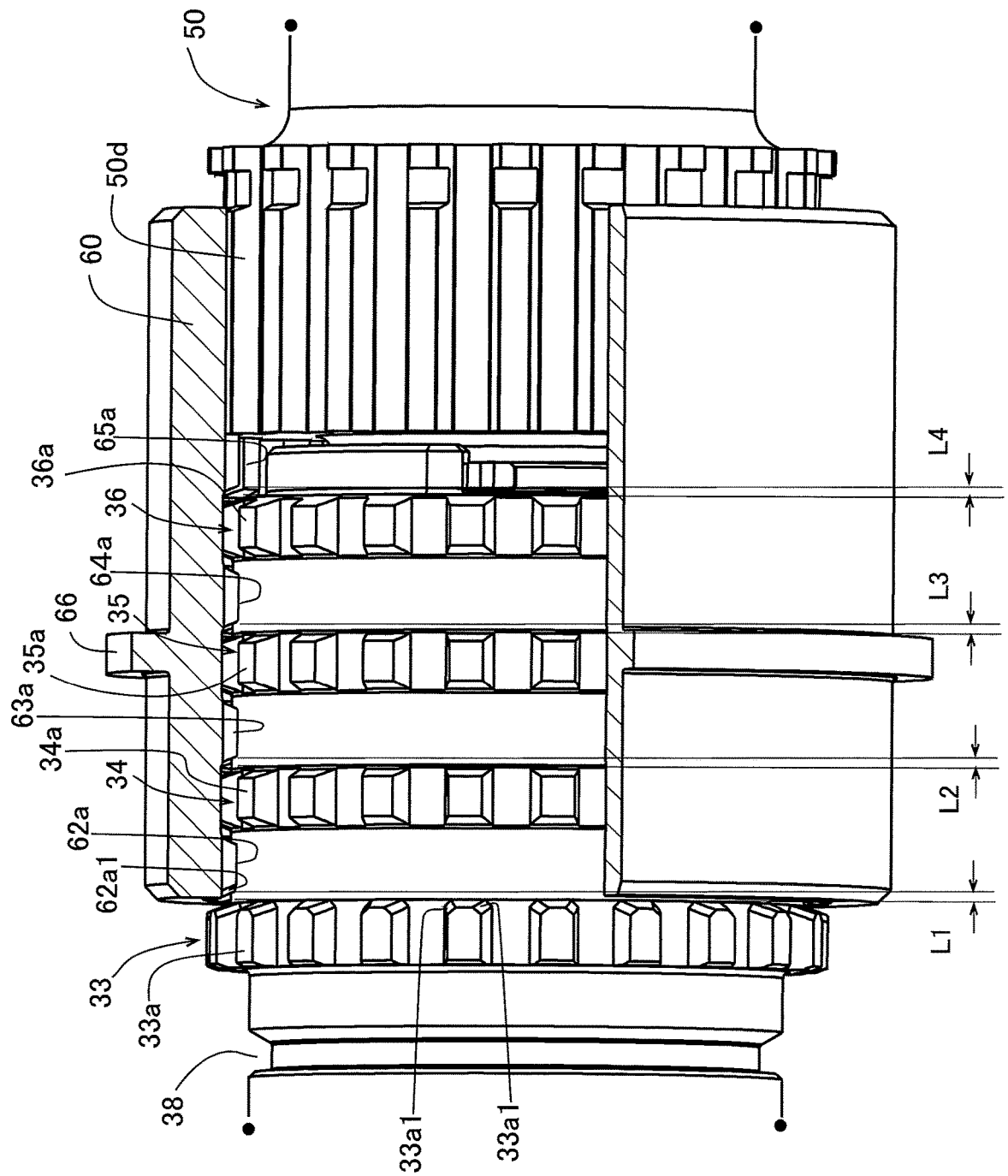
FIG. 13 is an explanatory view showing the plunging externally toothed spline and the plunging internally toothed spline.

Next, one example of an easy engagement operation between the internally toothed spline 61 of the sleeve 60 and the externally toothed spline 32 of the first shaft member 31 upon the movement of the sleeve 60 in the axis line 30 direction will be explained hereinafter with reference to FIGS. 13 and 14. The relative distance L1 in the axis line 30 direction between the external teeth 33a of the first externally toothed spline 33 which is one of the plurality of the first through fourth externally toothed splines 33 through 36 and the internal teeth 62a of the first internally toothed spline 62 which is one of the plurality of the first through fourth internally toothed splines 62 through 65, engaged with the external teeth 33a is as shown in FIG. 13, set shorter than the relative distances L2, L3 and L4 which are the relative distances in the axis line 30 direction of the others of the second through fourth externally toothed splines 34 through 36 and the others of the second through fourth internally toothed splines 63 through 65.

It is noted that in more concrete, the distance L2 is defined to be the relative distance in the axis line 30 direction between the external teeth 34a of the second externally toothed spline 34 and the internal teeth 63a of the second internally toothed spline 63 which are engaged with the external teeth 34a. Similarly, the distance L3 is defined to be the relative distance in the axis line 30 direction between the external teeth 35a of the third externally toothed spline 35 and the internal teeth 64a of the third internally toothed spline 64 which are engaged with the external teeth 35a. The distance L4 is defined to be the relative distance in the axis line 30 direction between the external teeth 36a of the fourth externally toothed spline 36 and the internal teeth 65a of the fourth internally toothed spline 65 which are engaged with the external teeth 36a.

Accordingly, the first internally toothed spline 62 can be plunged into the first externally toothed spline 33 prior to the plunging of the second through the fourth internally toothed splines 63 through 65 into the second through the fourth externally toothed splines 34 through 36. In this case, the first internally toothed spline 62 is defined to be the plunging internally toothed spline and the first externally toothed spline 33 is defined to be the plunging externally toothed spline.

Figure 14:
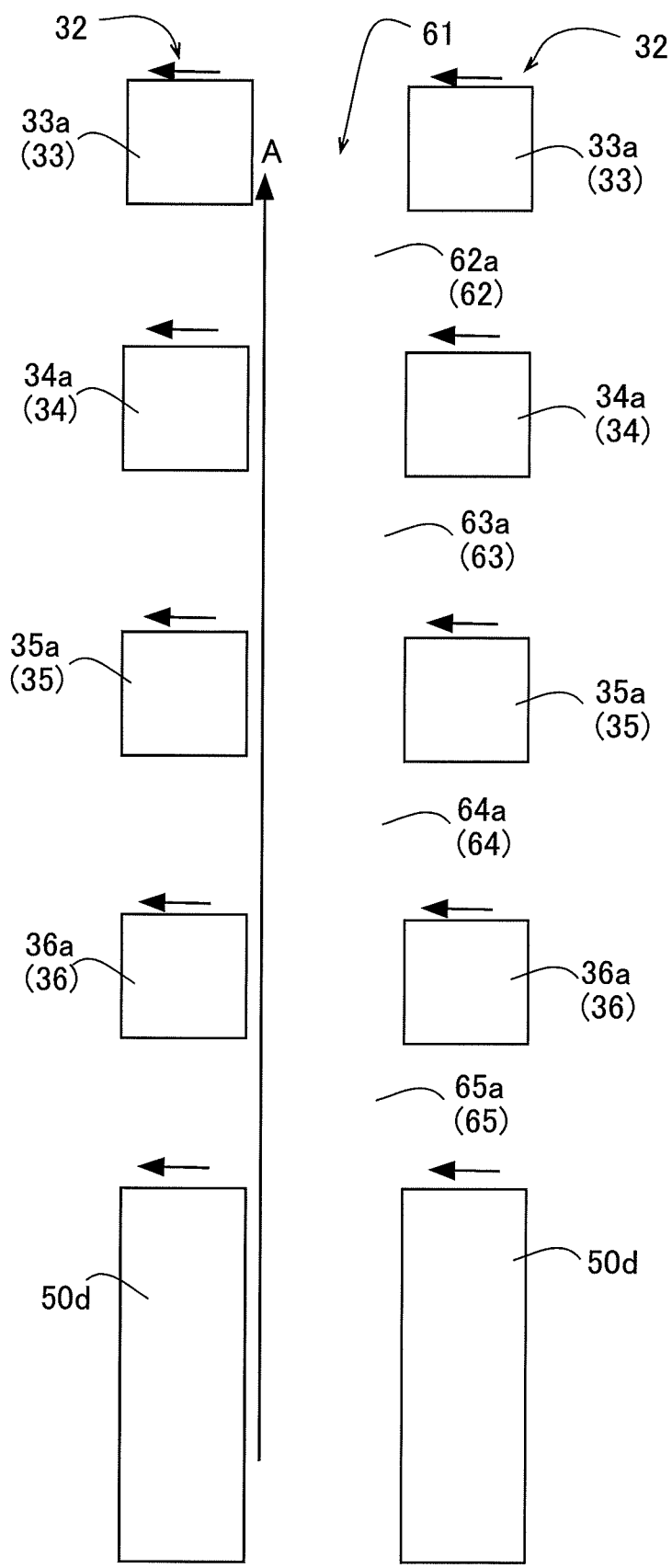
FIG. 14 is an explanatory view schematically showing a plunging operation by the plunging externally toothed spline and the plunging internally toothed spline.

With reference to FIG. 14, the plunging state of the first internally toothed spline 62 plunged into the first externally toothed spline 33 prior to the plunging of the second through the fourth internally toothed splines 63 through 65 into the second through the fourth externally toothed splines 34 through 36 will be explained hereinafter. The Arrow "A" direction in FIG. 14 indicates the direction in which the internal teeth 62a through 65a of the internally toothed spline 61 of the sleeve 60 move for spline-engagement with the external teeth 33a through 36a of the externally toothed spline 32 of the first shaft member 31 by the movement of the sleeve 60 in the axis line 30 direction. The arrow towards the left direction in FIG. 14 indicates the direction in which the internal teeth 62a through 65a of the internally toothed spline 61 and the external teeth 33a through 36a of the externally toothed spline 32 move by the rotation of the first shaft member 31 and the sleeve 60.

When the sleeve 60 moves in the arrow A direction as shown in FIG. 14, since the above explained relative distance L1 is shorter than the distances L2, L3 and L4, firstly, the internal teeth 62a plunge into the external teeth 33a and induced by the plunging of the internal teeth 62a, next, the internal teeth 63a through 65a plunge into the external teeth 34a through 36a, respectively. Thus, the engagement between the internal teeth 62a through 65a of the first through fourth internally toothed splines 62 through 65 can be performed smoothly.

It is noted here that the relative distance L1 in the example shown in FIG. 13 indicates that the distance L1 is shorter than the other relative distances L2, L3 and L4. However, the relation is not limited to this example, and it is possible to have any one of the relative distances L1 through L4 to be set shorter than the remaining ones, for example, the relative distance L3 is set to be shorter than the relative distances L1, L2 and L4. In this example also, the same effect can be attained thereby. It is also noted that in an example shown in FIG. 14, as the externally toothed spline 32, the first through fourth externally toothed splines 33 through 36 are provided and as the internally toothed spline 61, the first through fourth internally toothed splines 62 through 65 are provided. However, the invention is not limited to this structure and it is possible to provide the externally toothed spline 32 and the internally toothed spline 61 with the same number of splines, for example, each having two or five depending on the situation.

<Chamfering Portion>

Further, an example of avoiding any erroneous engagement between the internally toothed spline 61 of the sleeve 60 connected to the first shaft member 31 and the externally toothed spline 32 of the first shaft member 31 in a case where the difference in number of relative rotations between the first shaft member 31 and the second shaft member 50 is large will be explained hereinafter with reference to FIGS. 5, 13 and 15. As explained above, the first externally toothed spline 33 of the first shaft member 31 corresponds to the plunging externally toothed spline and each of the plurality of external teeth 33a is provided with a round-off corner shaped chamfering portion 33a1 at the facing surface side facing each corresponding plurality of internal teeth 62a of the first internally toothed spline 62 as shown in FIG. 13.

Similarly, as explained above, the first internally toothed spline 62 of the sleeve 60 corresponds to the plunging internally toothed spline and each of the plurality of internal teeth 62a is provided with a round-off corner shaped chamfering portion 62a1 at the facing surface side facing each corresponding plurality of external teeth 33a of the first externally toothed spline 33 as shown in FIGS. 5 and 13.

Further, an example of avoiding any erroneous engagement between the internally toothed spline 61 of the sleeve 60 connected to the first shaft member 31 and the externally toothed spline 32 of the first shaft member 31 in a case where the difference in number of relative rotations between the first shaft member 31 and the second shaft member 50 is large will be explained hereinafter with reference to FIG. 15. As explained above, the first externally toothed spline 33 of the first shaft member 31 corresponds to the plunging externally toothed spline and each of the plurality of external teeth 33a is provided with a round-off corner shaped chamfering portion 33a1 at the facing surface side facing each corresponding plurality of internal teeth 62a of the first internally toothed spline 62 as shown in FIG. 13. The Arrow "A" direction in FIG. 15 indicates the direction in which the internal teeth 62a through 65a of the internally toothed spline 61 of the sleeve 60 move for spline-engagement with the external teeth 33a through 36a of the externally toothed spline 32 of the first shaft member 31 by the movement of the sleeve 60 in the axis line 30 direction. The arrow towards the left direction in FIG. 14 indicates the direction in which the internal teeth 62a through 65a of the internally toothed spline 61 and the external teeth 33a through 36a of the externally toothed spline 32 move by the rotation of the first shaft member 31 and the sleeve 60.

Figure 15:
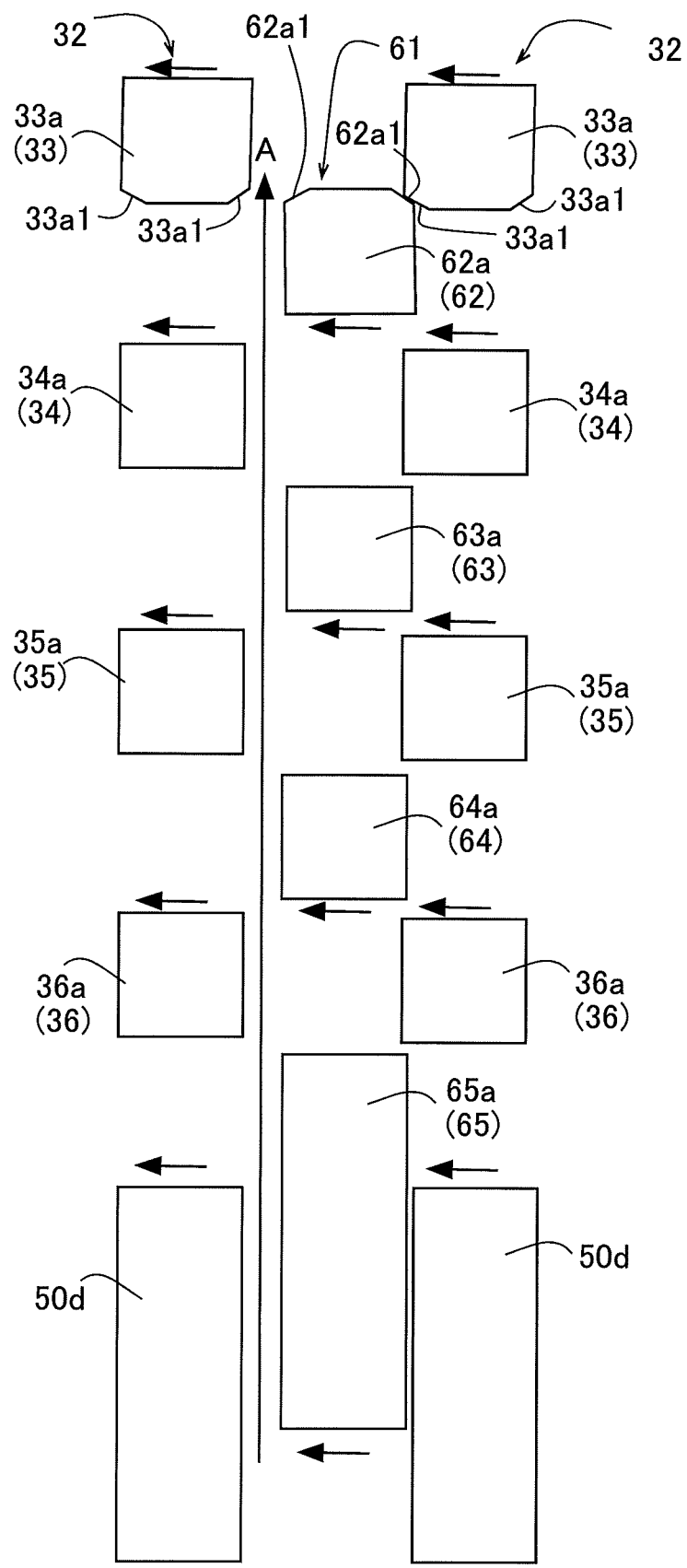
FIG. 15 is an explanatory view schematically showing an erroneous engagement preventing operation by a chambering portion.

When the sleeve 60 moves in the arrow A direction as shown in FIG. 15, firstly the first internally toothed spline 62 which corresponds to the plunging internally toothed spline of the sleeve 60 and the first externally toothed spline 33 which corresponds to the plunging externally toothed spline among the first through fourth internally toothed splines 62 through 65 and the first through fourth externally toothed splines 33 through 36 are brought into contact with each other. In more concrete, the chamfering portion 62a1 of the internal teeth 62a of the first internally toothed spline 62 is brought into contact with the chamfering portion 33a1 of the external teeth 33a of the first externally toothed spline 33.

However, since the difference in number of relative rotations between the first shaft member 31 and the second shaft member 50 is large, even the he chamfering portion 62a of the internal teeth 62a of the first internally toothed spline 62 is brought into contact with the chamfering portion 33a1 of the external teeth 33a of the first externally toothed spline 33, a load caused by the contact therebetween is generated which forces out the internal teeth 62a of the first internally toothed spline 62. Thus, the internal teeth 62a of the first internally toothed spline 62 are forced out from the external teeth 33a of the first externally toothed spline 33 without engaging therewith. Accordingly, the contact between the chamfering portion 62a1 of the internal teeth 62a of the first internally toothed spline 62 and the chamfering portion 33a1 of the external teeth 33a of the first externally toothed spline 33 does not perform torque transmission and therefore an erroneous engagement between the internally toothed spline 61 and the externally toothed spline 32 can be avoided, in the case where the difference in number of relative rotations is large.

In FIGS. 5, 13 and 15, an example that the chamfering portion is provided at both plurality of external teeth 33a of the first externally toothed spline 33 which corresponds to the plunging externally toothed spline and plurality of internal teeth 62a of the first internally toothed spline 62 which corresponds to the plunging internally toothed spline. However, the invention is not limited to this example and the chamfering portion is provided at only one of the plurality of external teeth 33a of the first externally toothed spline 33 which corresponds to the plunging externally toothed spline and the plurality of internal teeth 62a of the first internally toothed spline 62 which corresponds to the plunging internally toothed spline, such as for example, may be provided at only the plurality of internal teeth 62a of the first internally toothed spline 62, without providing the chamfering portions at the plurality of external teeth 33a of the first externally toothed spline 33. In this case, apparently, the advantageous effect of the invention can be similarly attained.

It is noted that in a case where the plunging externally toothed spline or the plunging internally toothed spline is not provided, it is possible to provide a chamfering portion at one of mutually engaging one or the plurality of external teeth of all externally toothed splines and one or the plurality of internal teeth of all internally toothed splines. In such case, the same advantageous effect of the invention can be apparently attained.

As stated above, according to the driving force connecting/disconnecting device explained in the above embodiment of the invention, the driving force connecting/disconnecting device includes a first shaft member 31 provided in a power transmitting route which transmits a driving force from a power source 11 and being rotatable about an axis line 30, a second shaft member 50 coaxially provided allowing a relative rotation to the first shaft member 31, an externally toothed spline 32 provided on an outer periphery of one of the first shaft member 31 and the second shaft member 50 and having a plurality of external teeth in a peripheral direction, an internally toothed spline 61 provided on an inner periphery to be in spline engagement with the externally toothed spline 32 and having a plurality of internal teeth in a peripheral direction, a sleeve 60 provided with the internally toothed spline 61 on the inner periphery thereof to be in spline engagement with the externally toothed spline 32 by moving in an axis line 30 direction and connecting the first shaft member 31 and the second shaft member 50 for transmitting the driving force by connecting the other of the first shaft member 31 and the second shaft member 50, a moving mechanism 70 which moves the sleeve 60 in the axis line 30 direction, a holder which holds the sleeve 60 and the moving mechanism 70 thereto for holding thereof and a positioning mechanism 80 for positioning the holder 79 in an axis line direction relative to the one of the first shaft member 31 and the second shaft member 50 by bringing the holder 79 into contact with the one of the first shaft member 31 and the second shaft member 50 thereby to mount the holder 79 to the first shaft member 31.

Thus, the holder 79, which holds the sleeve 60 provided with the internally toothed spline 61 in spline engagement with the externally toothed spline 32 by moving in the axis line 30 direction relative to the one of the first and the second shaft members 31, 50 which is provided with the externally toothed spline 32 and the moving mechanism 70, is brought into contact with the one of the first and the second shaft members 31, 50 to be positioned in the axis line 30 direction relative to the one of the first and the second shaft members 31, 50 and is mounted to the one of the first and the second shaft members 31, 50 by the positioning mechanism 80. Accordingly, the holder 79 i.e., the sleeve 60 can be directly positioned in the axis line 30 direction without intervening other members, such as bearing, by just contacting the holder 79 to the one of the first and the second shaft members 31, 50. As a result, the positioning accuracy can be improved for positioning the sleeve 60 in the axis line 30 direction by moving in the axial direction by the spline engagement between the externally toothed spline 32 and the internally toothed spline 61.

As explained, the driving force connecting/disconnecting device 16 of the above embodiment of the invention includes the positioning mechanism 80 which is formed by a stepped portion 37 provided at a predetermined position in the axis line 30 direction of one of the first shaft member 31 and the second shaft member 50, an end surface 72c1 of the holder 79 being contactable with the stepped portion 37, an installation groove 38 provided on one of the first shaft member 31 and the second shaft member 50 and a first snap ring 81 installed in the installation groove 38 and making the end surface 72c1 of the holder 79 to be in contact with the stepped portion 37. Thus, by contacting the holder 79 with the stepped portion 37 positioned at a first predetermined position and by installing the first snap ring 81 in the installation groove 38, the holder 79, i.e., the sleeve 60 can be positioned and installed relative to the axis line 30 direction of one of the first and the second shaft members 31, 50. Such positioning and installation can be easily performed by the structure above.

As explained, the driving force connecting/disconnecting device 16 of the above embodiment of the invention includes the detent mechanism 90 which is formed by a first detent portion 93 provided on the first shaft member 31 at a facing side to the second shaft member 50, a second detent portion 94 provided on the second shaft member 50 at a facing side to the first shaft member 31 and a detent member 95 which is engaged with the first detent portion 93 and the second detent portion 94, wherein the first shaft member 31 and the second shaft member 50 are formed as a unit allowing a relative rotation therebetween but restricting a relative movement therebetween in the axis line 30 direction. Thus, due to such unitization, handling or working becomes easy and the positioning of the first shaft member 31 and the positioning of the second shaft member 50 can be simultaneously performed which leads to simplification of handling or working.

As explained, the driving force connecting/disconnecting device 16 of the above embodiment of the invention includes the detent mechanism 90 wherein one of the first detent portion 93 and the second detent portion 94 is defined to be an outer periphery groove 94, a second snap ring 95 is provided to be fitted into the outer periphery groove 94 and a head portion 95b is provided at the snap ring 95 which extends radially outwardly from the outer periphery groove 94 and which is elastically deformable under a compressed state. The other of the first detent portion 93 and the second detent portion 94 is defined to be an inner periphery groove 93 which depth is deeper than an outer diameter of the head portion 95b of the second snap ring 95 and is formed to wrap the head portion 95b for allowing the relative rotation therebetween and wherein a portion of the inner periphery groove 93 is provided with a passing port 93a through which the head portion 95b of the second snap ring 95 under compressed state can enter the inside of the inner periphery groove 93. Thus, the detent mechanism 90 is formed by the outer periphery groove 94, the inner periphery groove 93 and the second snap ring 95 which is fitted into the outer periphery groove 94 and the inner periphery groove 93. Thus, the number of components forming the detent mechanism can be reduced to be manufactured with a simple structure.

As explained, the driving force connecting/disconnecting device 16 of the above embodiment of the invention is characterized in that the externally toothed spline 32 is provided on the first shaft member 31 and is formed by a plurality of splines with an interval separated from one another in the axis line 30 direction and the internally toothed spline 61 is provided on the sleeve 60 and is formed by a plurality of splines with an interval separated from one another in the axis line 30 direction, the plurality of externally toothed splines and the plurality of the internally toothed splines are engageable with each other, the relative distance L1 between one of the plurality of externally toothed splines and one of the plurality of internally toothed splines which engages with the one of the plurality of externally toothed splines in the axis line 30 is set to be shorter than the relative distances L2, L3 and L4 between the others of the plurality of externally toothed splines excluding the one of the plurality of externally toothed splines and the others of the plurality of internally toothed splines excluding the one of the plurality of internally toothed spline which engages with the others of the plurality of externally toothed splines in the axis line 30 direction and that the one (62) of the internally toothed splines is provided to be able to plunge into the one (33) of the externally toothed splines prior to the plunging of the others of the internally toothed splines into the others of the externally toothed splines, respectively.

According to the above structure, firstly, one internally toothed spline 62 plunges into one externally toothed spline 33 and induced by the plunging of the first internally toothed spline 62, next, the others of the internally toothed splines 63 through 65 plunge into the others of the externally toothed splines 34 through 36. Thus, the engagement between the first through fourth internally toothed splines 62 through 65 and the first through fourth externally toothed splines 33 through 36 can be performed smoothly.

As explained, the driving force connecting/disconnecting device 16 of the above embodiment of the invention is characterized in that the chamfering portion 33a1, 62a1 is provided at one of the plurality of external teeth 33a through 36a of the externally toothed spline 32 and the plurality of internal teeth 62a through 65a of the internally toothed spline 61. Thus, under a state that the difference in number of relative rotations between the first shaft member 31 and the second shaft member 50 is large, even the internally toothed spline 61 and the externally toothed spline 32 are brought into contact with each other at the chamfering portions 33a1, 62a1, the contact therebetween generates a load applied on the internally toothed spline 61 to eject and accordingly, the internally toothed spline 51 is ejected out from the externally toothed spline 32 without engaging therewith. Thus, the contact between the internally toothed spline 61 and the externally toothed spline 32 at the chamfering portions 33a1 and 62a1 cannot perform the torque transmission to avoid an erroneous engagement between the internally toothed spline 61 and the externally toothed spline 32 caused by a large difference in number of relative rotation between the first shaft member 31 and the second shaft member 50.

As explained, the driving force connecting/disconnecting device 16 of the above embodiment of the invention is characterized in that the externally toothed spline 32 is provided on the first shaft member 31 and is formed by a plurality of splines with an interval separated from one another in the axis line 30 direction and the internally toothed spline 61 is provided on the sleeve 60 and is formed by a plurality of splines with an interval separated from one another in the axis line 30 direction, the plurality of externally toothed splines 33 through 36 and the plurality of internally toothed splines 62 through 65 being engageable with each other, wherein the relative distance L1 between one of the plurality of externally toothed splines and one of the plurality of internally toothed splines which engages with the one of the plurality of externally toothed splines is set to be shorter than the relative distances L2, L3 and L4 between the others of the plurality of externally toothed splines excluding the one of the plurality of externally toothed splines and the others of the plurality of internally toothed splines excluding the one of the plurality of internally toothed spline which engages with the others of the plurality of externally toothed splines in the axis line 30 direction and wherein the one (62) of the internally toothed splines is provided to be able to plunge into the one (33) of the externally toothed splines prior to the plunging of the others of the internally toothed splines into the others of the externally toothed splines, respectively, the one (62) internally toothed spline being defined to be the plunging internally toothed spline 62 and the one (33) externally toothed spline being defined to be the plunging externally toothed spline 33 and a chamfering portion 33a1, 62a1 being provided at one of the plurality of external teeth 33a of the plunging externally toothed spline 33 and the plurality of internal teeth 62a of the plunging internally toothed spline 62.

Thus, under a state that the difference in number of relative rotations between the first shaft member 31 and the second shaft member 50 is large, even the chamfering portion 62a1 of the internal teeth 62a of the first internally toothed spline 62 is brought into contact with the chamfering portion 33a1 of the external teeth 33a of the first externally toothed spline 63, a load greater than the contacting force between the chamfering portion 62a1 and the chamfering portion 33a1 is generated to eject out the internal teeth 62a of the first internally toothed spline 62, and accordingly, the internal teeth 62a of the first internally toothed spline 62 are not brought into contact with the external teeth 33a of the first externally toothed spline 33 to be ejected out from the external teeth 33a of the first externally toothed spline 33. Thus, the contact between the chamfering portion 62a1 of the internal teeth 62a of the first internally toothed spline 62 and the chamfering portion 33a1 of the external teeth 33a of the first externally toothed spline 63 fails to transmit the torque. Thus, an erroneous engagement between the internally toothed spline 61 and the externally toothed spline 32 can be avoided which may appear when the difference in number of the relative rotations between the first shaft member 31 and the second shaft member 50 is large. Additionally, it is sufficient to provide the chamfering portion 33a1, 62a1 at only one side of the plurality of external teeth 33a of the plunging externally toothed spline 33 and the plurality of internal teeth 62a of the plunging internally toothed spline 62. According to the embodiment, the structure becomes simple and the manufacturing of the devices become easier, compared to the case where neither of the plunging externally toothed spline and the plunging internally toothed spline is provided and the chamfering portions are necessary to be provided at the plurality of external teeth of all of the externally toothed splines or the plurality of internal teeth of all of the internally toothed splines.

The present invention is not limited to the embodiment explained above and numerous modifications and variations of the present invention are possible in light of the above teachings. For example, the present invention can be applied to a transfer mechanism of a four-wheel drive vehicle and the four-wheel drive and the two-wheel drive can be changeable. Further, the invention is applied not only to a vehicle but also applicable to various devices and machines which need to connect/disconnect the driving force transmitting shaft.

EXPLANATION OF NUMERALS OR SYMBOLS

11: engine (power source)
16: driving force connecting/disconnecting device 30: axis line
31: first shaft member
32: externally toothed spline
33: plunging externally toothed spline
33a1: chamfering portion
37: stepped portion
38: installation groove
50: second shaft member
60: sleeve
61: internally toothed spline
62: plunging internally toothed spline
62a1: chamfering portion
70: moving mechanism
72c1: end surface
79: holder
80: positioning mechanism
81: snap ring (first snap ring)
90: detent mechanism
93: inner periphery groove (first detent portion)
93a: passing port
94: outer periphery groove (second detent portion)
95: snap ring (second snap ring, detent member)
95a: outer peripheral portion
95b: head portion

I claim:

1. A driving force connecting/disconnecting device comprising:
   a first shaft member provided in a power transmitting route which transmits a driving force from a power source and being rotatable about an axis line;
   a second shaft member coaxially provided with the first shaft member and relatively rotatable to the first shaft member;
   an externally toothed spline provided on an outer periphery of one of the first shaft member and the second shaft member and having a plurality of external teeth in a peripheral direction;
   an internally toothed spline engageable with the externally toothed spline and having a plurality of internal teeth on an inner periphery in a peripheral direction;
   a sleeve provided with the internally toothed spline on an inner periphery thereof which is engageable with the externally toothed spline by moving in an axis line direction and connecting the first shaft member and the second shaft member by being connected to the other of the first shaft member and the second shaft member for transmitting the driving force;
   a moving mechanism which moves the sleeve in the axis line direction;
   a holder which holds the sleeve and the moving mechanism thereto for holding thereof;
   a positioning mechanism for positioning the holder in the axis line direction relative to the one of the first shaft member and the second shaft member by bringing the holder into contact with the one of the first shaft member and the second shaft member thereby to mount the holder to the one of the first shaft member and the second shaft member; and
   a detent mechanism including a first detent portion provided at a facing side of the first shaft member facing the second shaft member, a second detent portion provided at a facing side of the second shaft member facing the first shaft member and a detent member locked by the first detent portion and the second detent portion, wherein the detent mechanism locks the first shaft member and the second shaft member, allowing a relative rotation therebetween but restricting a relative movement therebetween in the axis line direction;
   wherein the detent mechanism further includes a second snap ring fittable into an outer periphery groove which corresponds to one of the first detent portion and the second detent portion and having an elastically deformable head portion provided at a portion of an outer peripheral portion thereof and projecting outwardly in a radial direction the head portion being elastically deformable to be a compressed state when inserted into the outer periphery groove and a passing port formed at a portion of an inner periphery groove which corresponds to the other of the first detent portion and the second detent portion, wherein the inner periphery groove is set to be deeper than an outer diameter of the head portion of the second snap ring and wraps the head portion in the inner periphery groove to be relatively rotatable therebetween and wherein the passing port allows the head portion of the second snap ring under the compressed state to be passing through an inside of the inner periphery groove.

2. The driving force connecting/disconnecting device according to claim 1, wherein, the positioning mechanism includes a step portion provided at a first predetermined position in the axis line direction of the one of the first shaft member and the second shaft member, an end surface of the holder which is contactable with the stepped portion, an installation groove provided on the one of the first shaft member and the second shaft member and a first snap ring provided in the installation groove and bringing the end surface of the holder into contact with the stepped portion.

3. The driving force connecting/disconnecting device according to claim 1, wherein a plurality of externally toothed splines is provided on the first shaft member, each being separated from one another in the axis line direction and a plurality of internally toothed splines is provided on the sleeve, each being separated from one another in the axis line direction, wherein the plurality of externally toothed splines and the plurality of internally toothed splines are engageable and a relative distance between one of the externally toothed splines of the plurality of externally toothed splines and one of the internally toothed splines engageable with the one of the plurality of the externally toothed splines in the axis line direction is set to be shorter than respective relative distances between the others of the externally toothed splines of the plurality of externally toothed splines excluding the one of the externally toothed splines and the others of the internally toothed splines of the plurality of internally toothed splines excluding the one of the internally toothed splines in the axis line so that the one of the internally toothed splines is capable of plunging into the one of the externally toothed splines prior to plunging of the others of the internally toothed splines into the others of the externally toothed splines.

4. The driving force connecting/disconnecting device according to claim 1, wherein a chamfering portion is provided at one of the plurality of external teeth of the externally toothed spline and the plurality of internal teeth of the internally toothed spline.

5. The driving force connecting/disconnecting device according to claim 1, wherein a plurality of externally toothed splines is provided on the first shaft member, each being separated from one another in the axis line direction and a plurality of internally toothed splines is provided on the sleeve, each being separated from one another in the axis line direction, the plurality of externally toothed splines and the plurality of internally toothed splines are engageable, a relative distance between one of the externally toothed splines of the plurality of externally toothed splines and one of the internally toothed splines engageable with the one of the plurality of the externally toothed splines is set to be shorter than respective relative distances between the others of the externally toothed splines of the plurality of externally toothed splines excluding the one of the externally toothed splines and the others of the internally toothed splines of the plurality of internally toothed splines excluding the one of the internally toothed splines so that the one of the internally toothed splines is capable of plunging into the one of the externally toothed splines prior to plunging of the others of the internally toothed splines into the others of the externally toothed splines, the one of the internally toothed splines is defined to be a plunging internally toothed spline, the one of the externally toothed spline is defined to be a plunging externally toothed spline and a chamfering portion is provided at one of the plurality of internal teeth of the plunging internally toothed spline and the plurality of external teeth of the plunging externally toothed spline.

\* \* \* \* \*